(12) United States Patent
Jamali et al.

(10) Patent No.: US 11,598,964 B2
(45) Date of Patent: Mar. 7, 2023

(54) FREEFORM VARIFOCAL OPTICAL ASSEMBLY

(71) Applicant: Meta Platforms Technologies, LLC, Menlo Park, CA (US)

(72) Inventors: Afsoon Jamali, Redmond, WA (US); Gang Li, Bothell, WA (US); Changwon Jang, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 239 days.

(21) Appl. No.: 16/854,528

(22) Filed: Apr. 21, 2020

(65) Prior Publication Data

US 2021/0231952 A1     Jul. 29, 2021

Related U.S. Application Data

(60) Provisional application No. 62/965,455, filed on Jan. 24, 2020.

(51) Int. Cl.
*G02B 27/01*     (2006.01)
*G02F 1/137*     (2006.01)
(Continued)

(52) U.S. Cl.
CPC ....... *G02B 27/0172* (2013.01); *G02B 5/3083* (2013.01); *G02B 15/16* (2013.01);
(Continued)

(58) Field of Classification Search
CPC ............ G02B 27/0025; G02B 27/0101; G02B 27/011; G02B 27/017; G02B 27/0172;
(Continued)

(56) References Cited

U.S. PATENT DOCUMENTS 10,151,961 B2 *   12/2018   Lu .......................... G02B 30/25
11,175,508 B2 †   11/2021   Jamali
(Continued)

FOREIGN PATENT DOCUMENTS

EP     2012173 A2     1/2009
WO     2017096241 A1     6/2017

OTHER PUBLICATIONS

International Search Report and Written Opinion of International Application No. PCT/US2020/062529, dated Mar. 12, 2021, 11 pp.
(Continued)

*Primary Examiner* — Jason M Mandeville
(74) *Attorney, Agent, or Firm* — Shumaker & Sieffert, P.A.

(57) ABSTRACT

A freeform varifocal optical assembly includes at least three optical modules including a first plurality of optical elements including Pancharatnam-Berry phase (PBP) lenses, polarization sensitive hologram (PSH) lenses, metamaterials, or combinations thereof. The plurality of optical elements of each optical module include a property associated with a Zernike polynomial. Each of the first and the three optical modules are configurable between a plurality of optical powers. The freeform varifocal optical assembly is configurable to output a predetermined wavefront in response to an input wavefront.

21 Claims, 19 Drawing Sheets

(51) Int. Cl.
*G02B 15/16* (2006.01)
*G02B 27/00* (2006.01)
*G02B 5/30* (2006.01)
*G02F 1/29* (2006.01)

(52) U.S. Cl.
CPC ..... *G02B 27/0025* (2013.01); *G02F 1/13718* (2013.01); *G02B 5/3016* (2013.01); *G02B 2027/0178* (2013.01); *G02F 1/294* (2021.01)

(58) Field of Classification Search
CPC .............. G02B 15/16; G02B 2027/011; G02B 2027/0178; G02B 2027/0185; G02B 5/3016; G02B 26/06; G02B 13/14; G02B 5/3083; G02F 1/0136; G02F 1/13718; G02F 1/294
USPC ............................................................ 345/8
See application file for complete search history.

(56) References Cited

U.S. PATENT DOCUMENTS

| | | | |
|---|---|---|---|
| 11,221,479 B2* | 1/2022 | Zhao | G02B 27/0068 |
| 11,360,308 B2* | 6/2022 | Maimone | G02B 27/283 |
| 2007/0103642 A1* | 5/2007 | Bille | G02B 26/06 |
| | | | 351/212 |
| 2018/0188631 A1* | 7/2018 | Lu | G02B 5/30 |
| 2018/0239177 A1* | 8/2018 | Oh | G02B 6/0056 |
| 2019/0285891 A1 | 9/2019 | Lam et al. | |

OTHER PUBLICATIONS

Clark, "Modeling and measuring liquid crystal tunable lenses," Proceedings of SPIE, IEEE, US, vol. 9293, Dec. 17, 2014, 7 pp.
International Preliminary Report on Patentability for International Application No. PCT/US2020/062529, dated Aug. 4, 2022, 9 pages.
Serati, et al, Large-aperture, wide-angle nonmechanical beam steering using polarization gratings, 10 pages, Mar. 2017, Optical Engineering.†
Subhabrata Bhattacharya, a simple interpretation of Zernike Polynomials, 6 pages, Dec. 17, 2020, https://www.quickguide.org/post/a-simple-interpretation-of-zernike-polynomials.†
Prakash, et al, Wavefront Optics for the Non-Mathematician, 18 pages, Feb. 2016, CRSTEurope. https://crstodayeurope.com/articles/2016-feb/wavefront-optics-for-the-non-mathematician/.†

* cited by examiner
† cited by third party

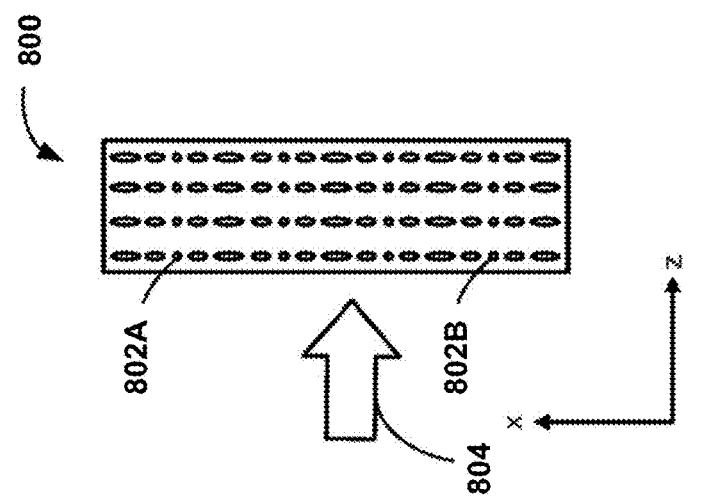
FIG. 8C
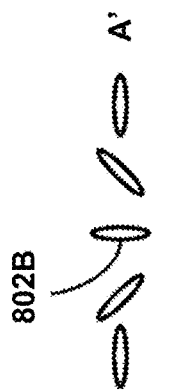
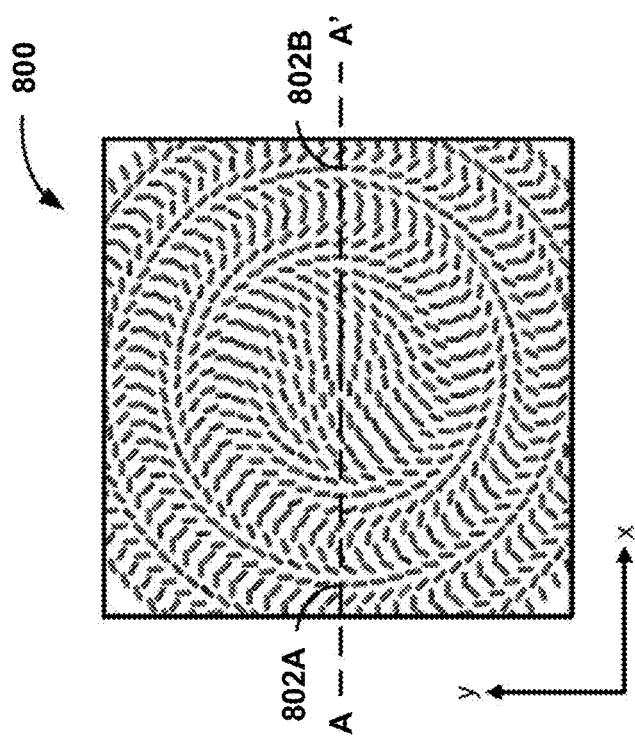
FIG. 8B
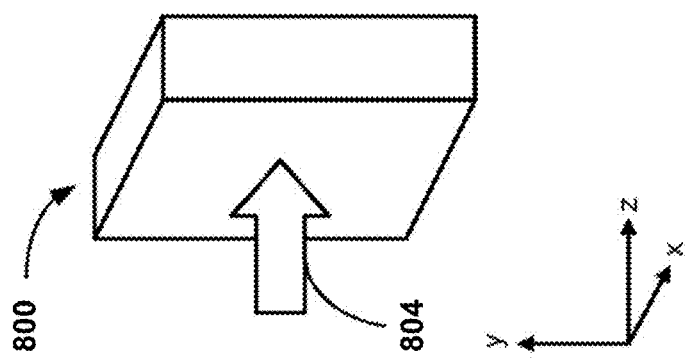
FIG. 8D
FIG. 8A

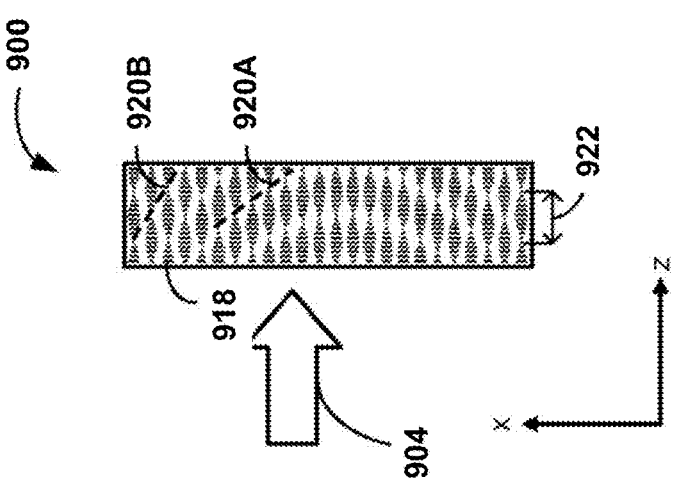
FIG. 9C
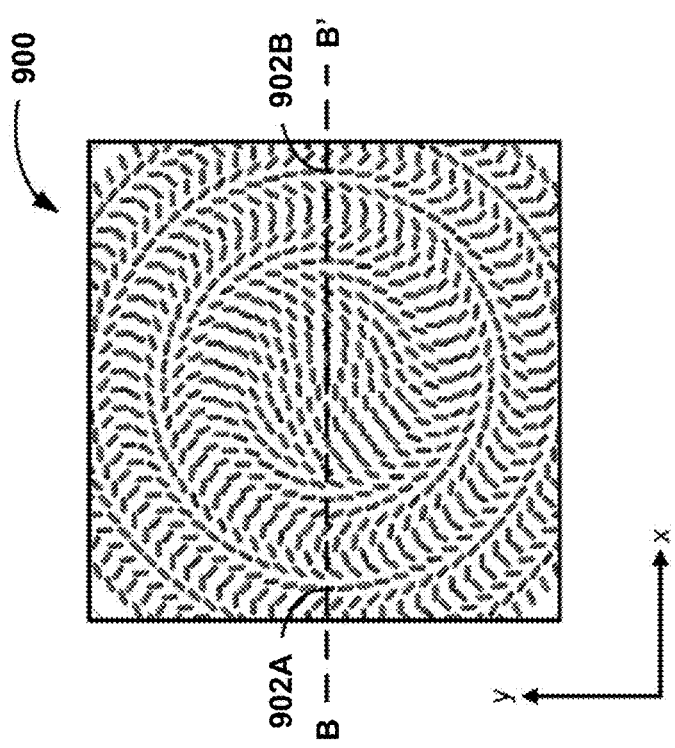
FIG. 9B
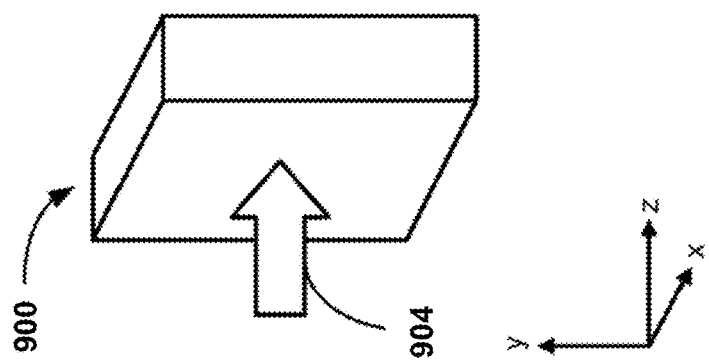
FIG. 9A
FIG. 9D

FREEFORM VARIFOCAL OPTICAL ASSEMBLY

This application claims the benefit of U.S. Provisional Application No. 62/965,455, filed Jan. 24, 2020, the content of which is incorporated by reference in its entirety.

TECHNICAL FIELD

This disclosure generally relates to optical elements and optical systems implemented in various types of electronic systems and devices.

BACKGROUND

Optical devices, including head-mounted display devices, provide visual information to a user. For example, head-mounted displays are used for virtual reality and augmented reality operations. A head-mounted display often includes an electronic image source and an optical assembly.

Accommodation refers to a vision process in which the sciliary muscles and suspensory ligaments of a human eye cause the lens of the eye to bulge or flatten to focus objects on the retina. If accommodation of an eye is imperfect, parallel light rays incident on the lens can converge to a point behind the retina (hypermetropia, or farsightedness) or a point in front of the retina (myopia, or nearsightedness). To correct these visual defects, a converging lens of an appropriate focal length is placed in front of a hypermyotropic eye, and a diverging lens of an appropriate focal length is placed in front of a myopic eye. Lenses placed in front of the eye provide a spherical correction, the degree of which depends on the focal length of the lens in positive or negative diopters (D).

Higher order aberrations, such as astigmatism, coma, trefoil, quadrafoil, secondary astigmatism and the like, can cause refractive errors in which the eye does not focus light evenly onto the retina. Aberrations can cause images to appear blurry and stretched out, and can result in headaches, eyestrain, squinting, and distorted or blurred vision.

SUMMARY

A varifocal optical assembly includes multiple adjustable stages configurable to have adjustable optical power, and in one example could be used in an optical device such as a head mounted display such that a displayed image of an object is properly focused on the retina of the eyes of the display observer. In the optical assemblies, a focal length of an optical stack having a plurality of optical stages can be adjusted by changing the respective states of one or more of the optical stages. For example, in a first state, an optical stage could be configured to have a first respective optical power for light of a first polarization and a second respective optical power, different from the first respective optical power, for light of a second polarization that is orthogonal to the first polarization. In a second state, the respective optical stage could be configured to have a third optical power for light of the first polarization and a fourth optical power for light of the second polarization. The focal lengths of the optical stacks and an overall optical power of the varifocal optical assemblies (measured in + or − D as discussed above) can be varied by configuring one or more successive optical stages of the assembly to provide wavefront correction and/or adjustment and enhance accommodation for the observer.

In general, the present disclosure is directed to a freeform varifocal optical assembly that can be used as a component of the optical system of a display device (e.g., a head-mounted display device). The varifocal optical assembly includes an optical stack that can be configured to enhance the accommodation of one or both eyes of a display observer by providing focus and higher order aberration correction to increase the observer's overall comfort and enjoyment while using the display device. The present disclosure is also directed to a freeform varifocal optical assembly that can be used to output a predetermined wavefront from an arbitrary input wavefront independent of the optical system of a display device. For example, the freeform varifocal optical assembly can be used as an adaptive optical element, e.g. so as to compensate for distortions in a wavefront. In some examples, the freeform varifocal optical assembly can be configured to output a variable wavefront based on different combinations of respective wavefront adjustments of optical modules comprising the varifocal optical assembly.

The varifocal optical assembly includes lensing optical assemblies that can form an optical stack between the display and one or both eyes of the observer. The lensing optical assemblies can be configured to correct lower order aberrations for each eye, like a corrective spectacle lens, as well as higher order aberrations. The lensing optical assemblies are thin and lightweight, which reduces the overall weight of a head mounted display (or any optical device), and provides a more optimal device form factor, either or both of which can enhance the viewing experience for the observer.

In some examples, the disclosure describes a freeform varifocal lens including at least three optical modules, each optical module comprising a corresponding plurality of polarization sensitive optical elements. Each optical module is associated with a corresponding Zernike polynomial, and for each optical module, the corresponding plurality of optical elements comprises a corresponding property associated with the corresponding Zernike polynomial. The corresponding Zernike polynomial associated with each optical module may be different.

In some examples, the disclosure describes a head mounted display including a display configured to emit image light. The head mounted display further includes a freeform varifocal optical assembly including at least three optical modules, each optical module comprising a corresponding plurality of polarization sensitive optical elements. Each optical module is associated with a corresponding Zernike polynomial, and for each optical module, the corresponding plurality of optical elements comprises a corresponding property associated with the corresponding Zernike polynomial. The corresponding Zernike polynomial associated with each optical module may be different.

In some examples, the disclosure describes a method including transmitting light through at least three optical modules, each optical module comprising a plurality of polarization sensitive optical elements. Each optical module is associated with a corresponding Zernike polynomial, and for each optical module, the corresponding plurality of optical elements comprises a corresponding property associated with the corresponding Zernike polynomial. The corresponding Zernike polynomial associated with each optical module may be different. The method further includes adjusting the focal power of one or more of the at least three optical modules by changing respective states of one or more optical elements of the plurality of optical elements in the one or more of the at least three optical modules.

Thus, the disclosed embodiments provide display devices with adjustable optical power to decrease eye fatigue and improve user comfort and satisfaction with such devices, as well as providing wavefront shaping to output a desired wavefront from an arbitrary input wavefront.

BRIEF DESCRIPTION OF THE DRAWINGS

FIGS. 8A-8D are schematic diagrams illustrating an example Pancharatnam-Berry phase lens for a spherically lensing optical module.

FIGS. 9A-9D are schematic diagrams illustrating an example polarization sensitive hologram lens for a spherically lensing optical module.

Like symbols in the drawings indicate like elements.

DETAILED DESCRIPTION

The present disclosure is directed to a freeform varifocal optical assembly that can be used as a component of an optical system, such as an optical system of a display device (e.g., a head-mounted display device). The varifocal optical assembly includes an optical stack that can be configured to output a predetermined wavefront from an arbitrary input wavefront. The varifocal optical assembly may include a plurality of optical modules. Each optical module may include at least one polarization sensitive or polarization-selective lensing element and may be associated with a selected type of lensing (e.g., a selected type of optical aberration). By including a plurality of optical modules, each optical module including at least one polarization sensitive lensing element and controlling polarization of light incident to the polarization sensitive lensing elements, the varifocal optical assembly may be controlled to output a predetermined wavefront from an arbitrary input wavefront (or an arbitrary output wavefront from a predetermined input wavefront).

In some examples, the varifocal optical assembly may be used to enhance the accommodation of one or both eyes of a display observer by providing focus and higher order aberration correction to increase the observer's overall comfort and enjoyment while using a display device, such as a head-mounted display device. The present disclosure is also directed to a freeform varifocal optical assembly that can be used to output a predetermined wavefront from an arbitrary input wavefront independent of the optical system of a display device. For example, the freeform varifocal optical assembly can be used as an adaptive optic.

Figure 1:
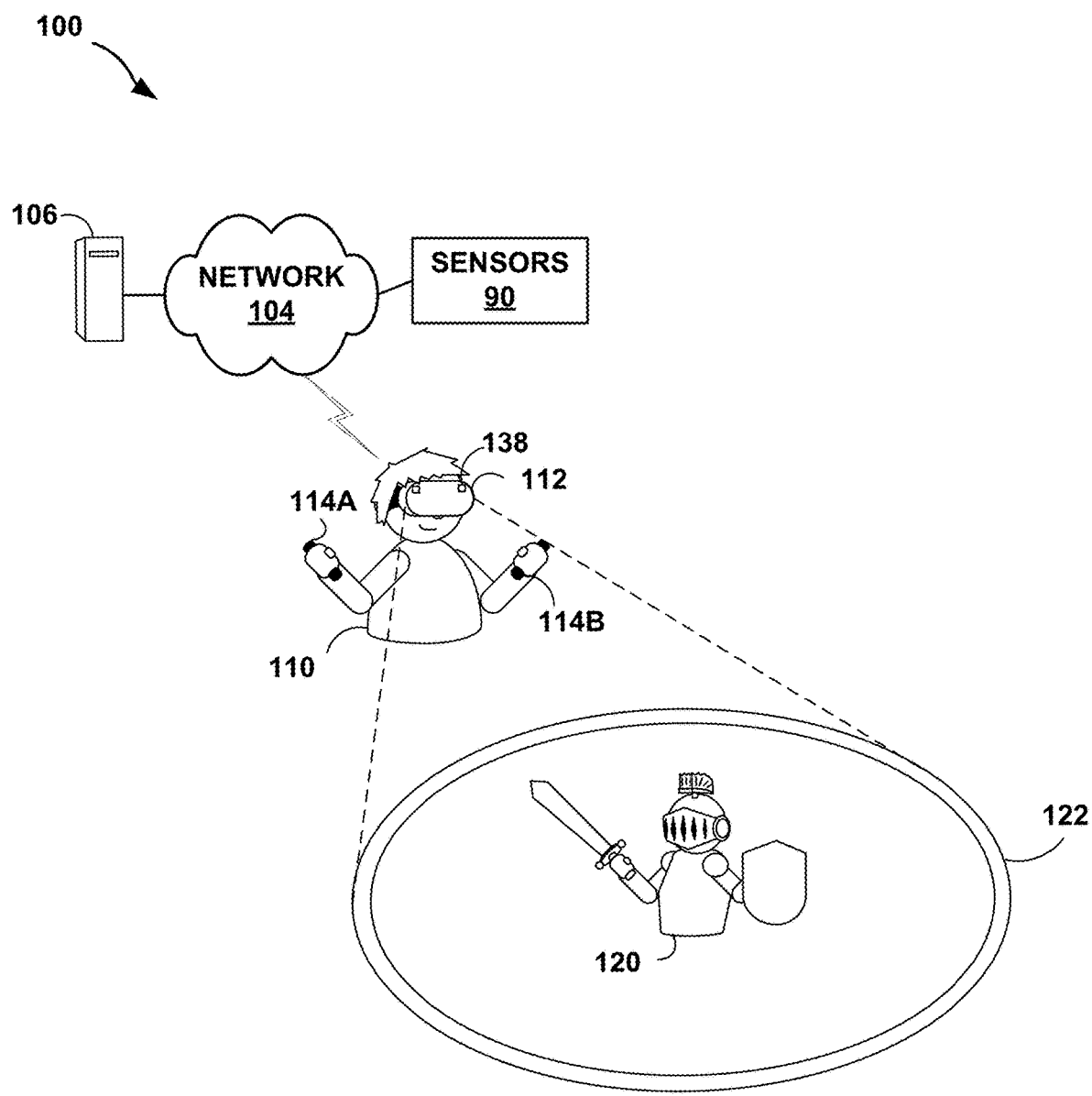
FIG. 1 is an illustration depicting an example artificial reality system that includes a freeform varifocal optical assembly configured to provide aberration compensation, in accordance with the techniques described in this disclosure.

FIG. 1 is an illustration depicting an example artificial reality system includes a varifocal optical assembly that can be used to output a predetermined wavefront from an arbitrary input wavefront, in accordance with the techniques described in this disclosure. In the example of FIG. 1, artificial reality system 100 includes HMD 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each controller(s) 114 is an input device that user 110 may use to provide input to console 106, HMD 112, or another component of artificial reality system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by artificial reality system 100.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile artificial reality system, and artificial reality system 100 may omit console 106.

In general, artificial reality system 100 renders artificial reality content 122 for display to user 110 at HMD 112. In the example of FIG. 1, a user 110 views the artificial reality content 122 constructed and rendered by an artificial reality application executing on HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of user 110.

To provide a comfortable viewing experience for user 110, HMD 112 may include a lens system for focusing light output by a display device of HMD 112 at the eyes of user 110. To further enhance user comfort and reduce the vergence-accommodation conflict that user 110 may experience while using HMD 112, an optical assembly or system of HMD 112 may include a varifocal optical assembly, which changes apparent depth of images by changing focal states. While this may reduce vergence-accommodation conflict, user 110 may still need to wear prescription optics (such a prescription eyeglasses) to compensate for astigmatism and other higher order aberrations. Wearing prescription optics may interfere with the fit of HMD 112, reducing comfort of user 110.

In accordance with the techniques of this disclosure, HMD 112 includes a freeform varifocal optical assembly that provides focal power and higher order aberration correction. The freeform varifocal optical assembly may include a plurality of optical modules, each optical module associated with a corresponding Zernike polynomial. Each optical module may include a plurality of polarization sensitive lensing elements, such as Pancharatnam-Berry Phase (PBP; also referred to as geometric phase) lenses, polarization sensitive hologram (PSH) lenses, and/or metamaterials (e.g., metasurfaces). By controlling polarization of light incident on each respective lensing element, and/or a state of the lensing element, the optical modules of the freeform varifocal optical system may be controlled to have a selected optical power associated with the corresponding Zernike polynomial. In some examples, the freeform varifocal optical assembly may include one or more liquid lenses, one or more movable conventional lenses, one or more pancake lenses, or combinations thereof, in addition to the optical modules. In some examples, each optical module is associated with a single Zernike polynomial. In some examples, each optical module is associated with two or more Zernike polynomials.

Additionally, by controlling an orientation of the directors of the liquid crystal (LC) molecules within the polarization sensitive lensing elements (e.g., during manufacturing of the polarization sensitive lensing elements), the polarization sensitive lensing elements may be configured to provide selected types of lensing. Similar effects may be achieved by controlling structure of the metamaterial. As such, the lenses within the freeform varifocal optical system may have LC directors oriented in a pattern configured to provide spherical lensing, while other lenses may have LC directors oriented in a pattern configured to provide cylindrical lensing along a selected axis to compensate for astigmatism, and still other lenses may have LC directors oriented in a pattern to compensate for higher order aberrations. By including a freeform varifocal optical system with controllable optical power for each of a plurality of optical modules, the freeform varifocal optical systems or assemblies described herein may provide aberration compensation of a selected optical power without requiring user 110 to wear prescription optics, thus increasing comfort of user 110 and improving the experience of user 110 when using HMD 112. Alternatively, a freeform varifocal optical system may be used in any selected optical systems to output a selected wavefront based on an input wavefront.

Figure 2A:
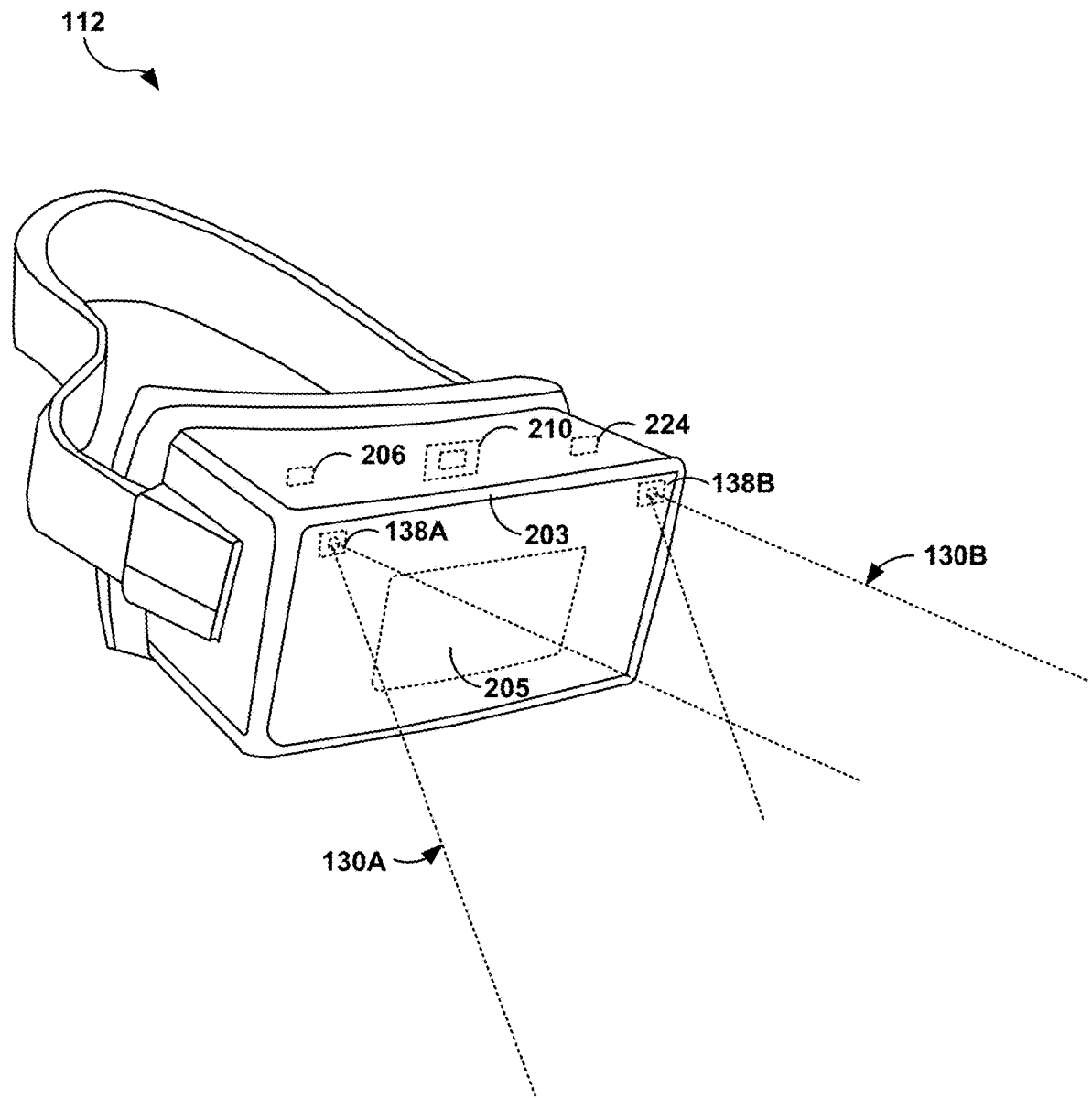
FIG. 2A is an illustration depicting an example HMD that includes a freeform varifocal optical assembly configured to provide aberration compensation, in accordance with techniques described in this disclosure.

FIG. 2A is an illustration depicting an example HMD 112 that includes a freeform varifocal optical system that provides aberration compensation, in accordance with techniques described in this disclosure. HMD 112 of FIG. 2A may be an example of HMD 112 of FIG. 1. HMD 112 may be part of an artificial reality system, such as artificial reality system 100 of FIG. 1, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user via a freeform varifocal optical system 205. Electronic display 203 may be any suitable display technology, as described above. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

Freeform varifocal optical system 205 includes optical elements configured to manage light output by electronic display 203 for viewing by the user of HMD 112 (e.g., user 110 of FIG. 1). The optical elements may include, for example, one or more lens, one or more diffractive optical element, one or more reflective optical elements, one or more waveguides, or the like, that manipulates (e.g., focuses, defocuses, reflects, refracts, diffracts, or the like) light output by electronic display 203. For example, freeform varifocal optical system 205 may be any of the freeform varifocal optical systems described herein with reference to FIGS. 1, 6, 7, and 8.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 2B:
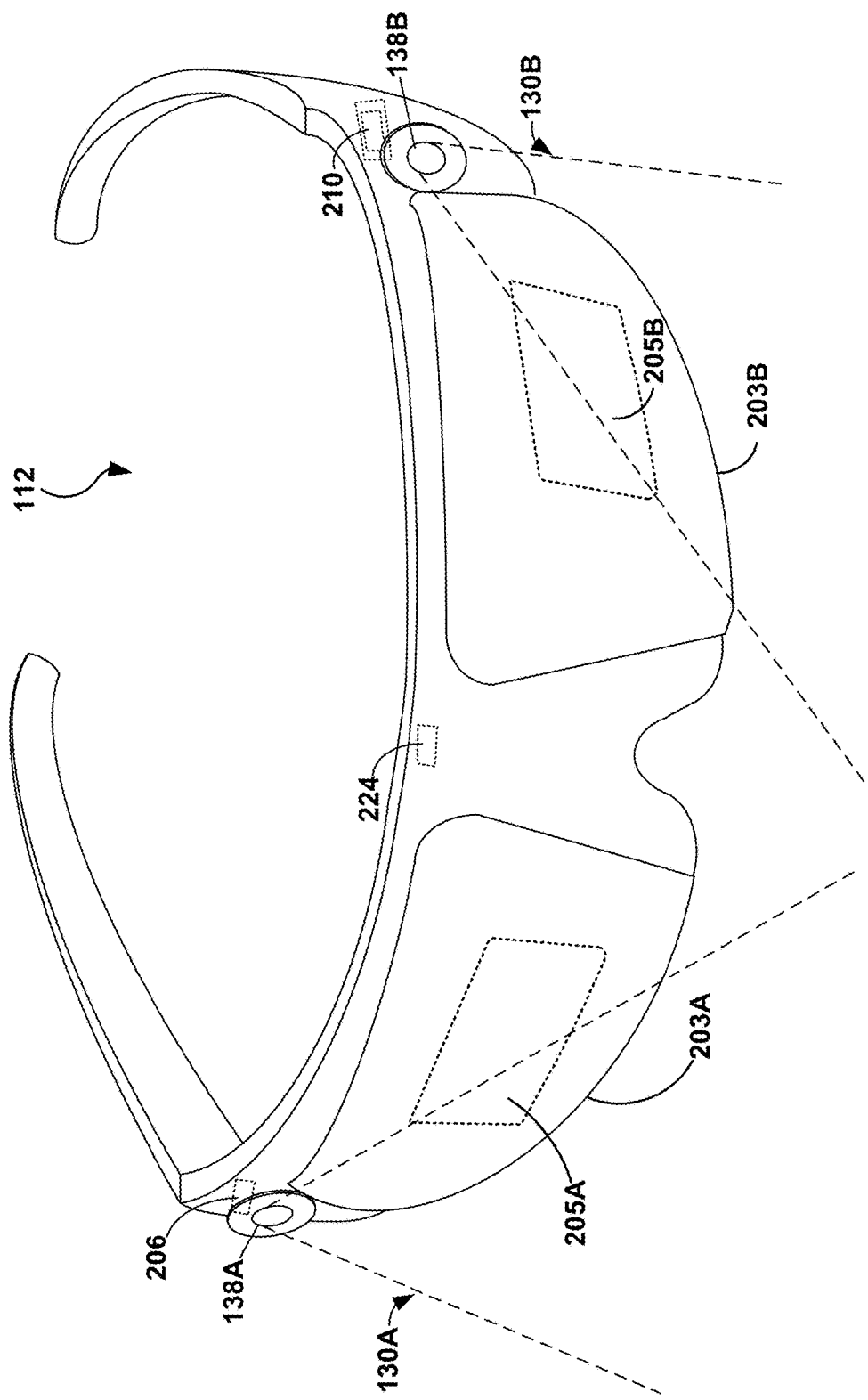
FIG. 2B is an illustration depicting another example HMD that includes a varifocal optical assembly configured to provide aberration compensation, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of HMD 112 of FIG. 1. HMD 112 may be part of an artificial reality system, such as artificial reality system 100 of FIG. 1, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes one or more interior-facing electronic displays 203A and 203B (collectively, "electronic displays 203") configured to present artificial reality content to the user and one or more freeform varifocal optical systems 205A and 205B (collectively, "freeform varifocal optical systems 205") configured to manage light output by interior-facing electronic displays 203. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, one or more integrated image capture devices 138A and 138B (collectively, "image capture devices 138"), an internal control unit 210, which may include an internal power source and one or more printed-circuit boards having one or more processors, memory, and hardware to provide an operating environment for executing programmable operations to process sensed data and present artificial reality content on display 203.

Figure 3:
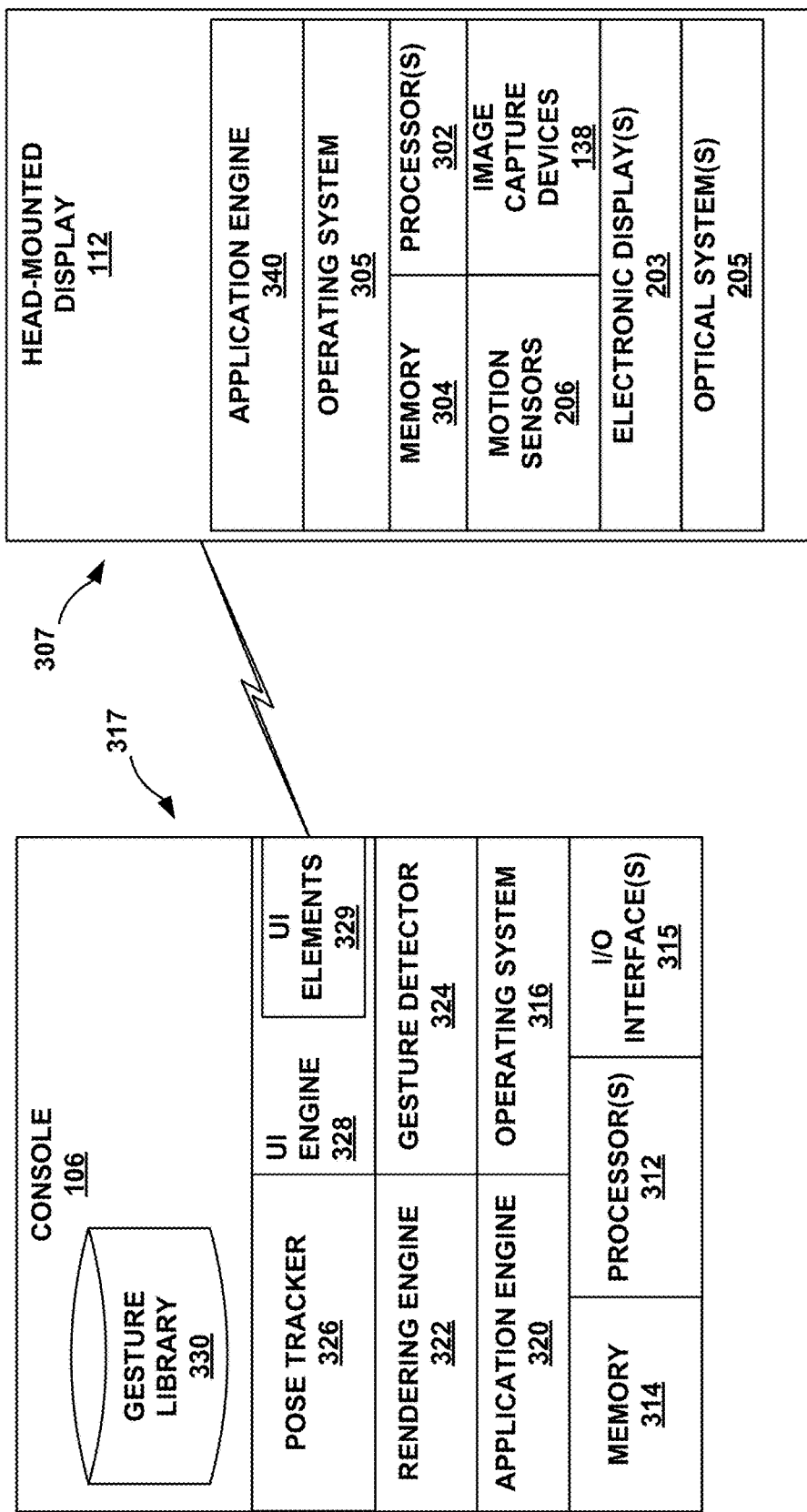
FIG. 3 is a block diagram showing example implementations of a console and an HMD of the artificial reality system of FIG. 1, in accordance with techniques described in this disclosure.

FIG. 3 is a block diagram showing example implementations of an artificial reality system that includes console 106 and HMD 112, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206, image capture devices 138, and, in some examples, optical system 205. In some examples, processors 302 and memory 304 may be separate, discrete components. In other examples, memory 304 may be on-chip memory collocated with processors 302 within a single integrated circuit.

In general, console 106 is a computing device that processes image and tracking information received from image capture devices 138 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controller(s), display device(s), image capture device(s), HMD(s), peripheral device(s), and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel, to HMD 112 for display at HMD 112.

Based on the sensed data from any of the image capture devices 138, or other sensor devices, gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by image capture devices 138 of HMD 112 and/or sensors 90 and external cameras 102 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

In accordance with the techniques described herein, freeform varifocal optical system(s) 205 may be configured to also provide vision correction and visual system aberration correction. For example, freeform varifocal optical system(s) 205 may include a spherically lensing optical module and aberration compensation optical assemblies. The spherically lensing module and aberration compensation optical modules may be any of those described herein. The freeform varifocal optical system(s) 205 may be configured to also provide a predetermined wavefront from an arbitrary input wavefront, for example, as an adaptive optic.

Figure 4:
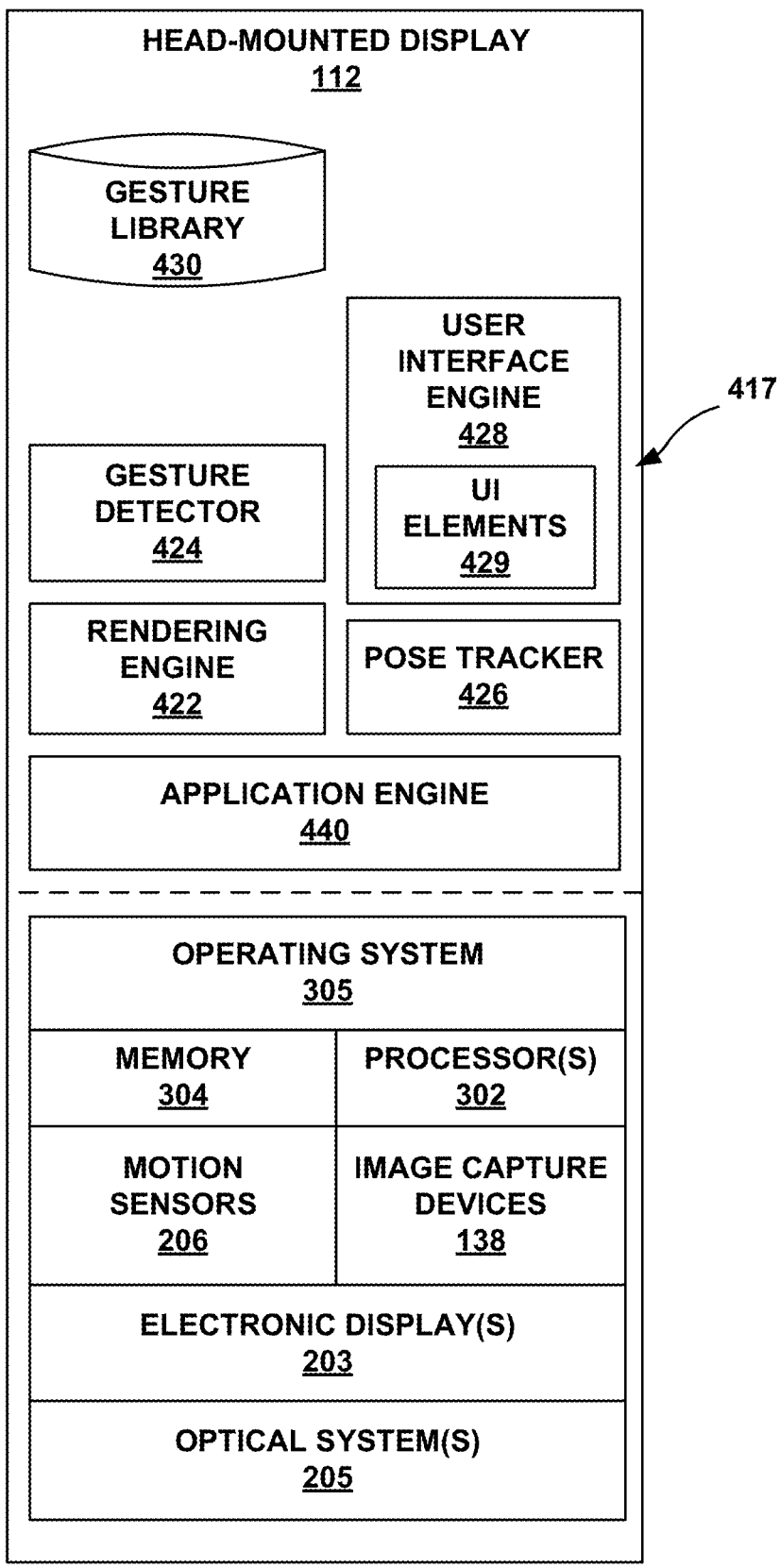
FIG. 4 is a block diagram depicting an example HMD of the artificial reality system of FIG. 1, in accordance with the techniques described in this disclosure.

FIG. 4 is a block diagram depicting an example in which HMD 112 is a standalone artificial reality system, in accordance with the techniques described in this disclosure. In this example, like FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display(s) 203, freeform varifocal optical system(s) 205, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, controller(s) 114, or other sensor devices, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110.

Figure 5:
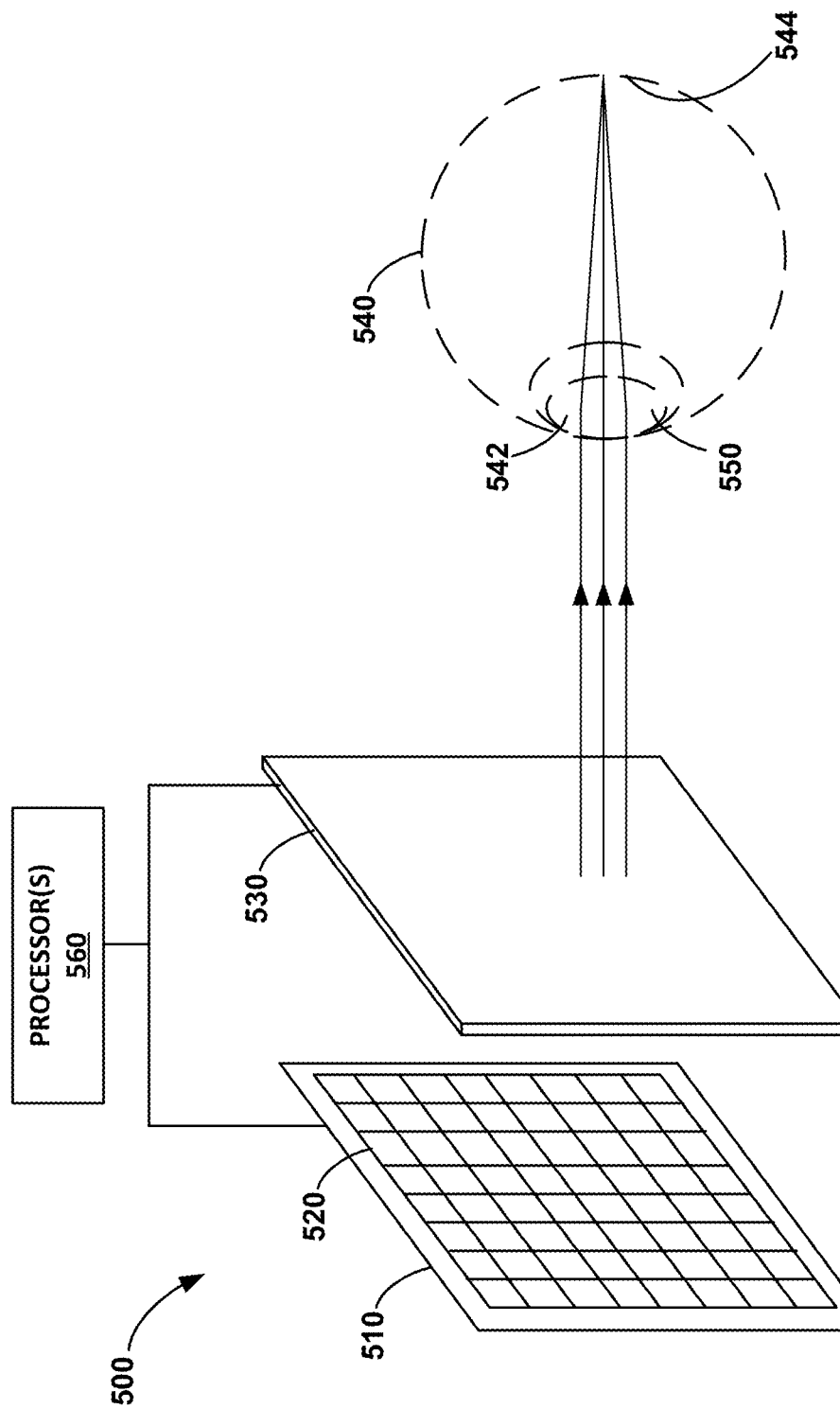
FIG. 5 is a schematic perspective view of an example display device.

FIG. 5 is an isometric view of an example display device 500, which includes examples of the components of the display(s) 203 and optical system(s) 205 of FIGS. 2A-4. In some examples, display device 500 includes light emission device array 510 and a freeform varifocal optical system 530. Light emission device array 510 emits image light toward the viewing user. Light emission device array 510 may be, e.g., an array of LEDs, an array of microLEDs, an array of OLEDs, or some combination thereof. Light emission device array 510 includes light emission devices 520 that emit light in the visible range.

In some examples, display device 500 includes an emission intensity array configured to selectively attenuate light emitted from light emission array 510. In some examples, the emission intensity array is composed of a plurality of liquid crystal cells or pixels, groups of light emission devices, or some combination thereof. Each of the liquid crystal cells is, or in some examples, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array can control what portion of the image light emitted from light emission device array 510 is passed to freeform varifocal optical system 530. In some examples, display device 500 uses an emission intensity array to facilitate providing image light to a location of pupil 550 of eye 540 of a user and minimize the amount of image light provided to other areas in the eyebox.

Freeform varifocal optical system 530 receives the image light (e.g., attenuated light) from the emission intensity array (or directly from emission device array 510) and focuses the image light to a location of pupil 550, where the image light is focused by the lens 342 of the eye 340 onto the retina 344. While focusing the image light to the location of pupil 550, freeform varifocal optical system 530 may provide, spherical, cylindrical, and higher order lensing to provide aberration compensation for the user.

In some examples, display device 500 includes one or more broadband sources (e.g., one or more white LEDs) coupled with a plurality of color filters, in addition to, or instead of, light emission device array 510.

Freeform varifocal optical system 530 includes a plurality of polarization sensitive lensing elements, such as lenses formed from liquid crystals. Examples of polarization sensitive lensing elements formed from liquid crystals include PBP lenses (also referred to as geometric phase lenses), and/or PSH lenses. Another example of a suitable polarization sensitive lensing element includes a metamaterial or metasurface. Polarization sensitive lensing elements may exhibit different optical powers for incident light having different polarization. By controlling polarization of light incident on each respective lens, and/or a state of the lens, the optical system may be controlled to have a selected total optical power. By including a plurality of optical modules, each respective optical module associated with a corresponding lensing effect, the optical system may be controlled to have a selected total optical power associated with each lensing effect (e.g., tilt, spherical, cylindrical, coma, trefoil, quadrafoil, secondary astigmatism, or the like). In this way, the optical system may be a freeform varifocal optical system.

As mentioned above with respect to FIG. 1, freeform varifocal optical system 530 may include an aberration compensation optical assembly and a spherically lensing optical module. The aberration compensation optical assembly may include a plurality of aberration compensation optical modules. Each aberration compensation optical module may include at least one polarization sensitive lensing element. In the aberration compensation optical assembly, the polarization sensitive lensing elements may be configured (e.g., based on a pattern of the liquid crystal directors within the lens) to exhibit aberration compensation lensing along a selected axis. For example, some of the polarization sensitive lensing elements may be configured to compensate for a particular aberration in a first axis (e.g., vertical astigmatism, vertical trefoil, vertical coma, etc.) and some of the polarization sensitive lensing elements may be configured to compensate for a particular aberration in a second axis (e.g., oblique astigmatism, oblique trefoil, oblique coma, etc.). At least some of the polarization sensitive lensing elements may be configured with different optical powers, e.g., by selecting the pattern of the liquid crystal directors. For example, the polarization sensitive lensing elements may have optical powers that are about powers of 2 (e.g., $2^0=1$ Diopters, $2^{-1}=0.5$ Diopters, and $2^{-2}=0.25$ Diopters).

In some examples, freeform varifocal optical system 530 may be configured to steer the exit pupil of the display device 500. For example, freeform varifocal optical system 530 may include aberration compensation optical modules associated with the first order tilt and tip Zernike polynomials as described below with respect to FIG. 11. As such, freeform varifocal optical system 530 may shift image points vertically, via tilt, and horizontally via shift. Such image points may include the image of light emission device array 510, and may also include the image of the stop of the display device 500, in other words, the exit pupil of the display device 500. In addition, freeform varifocal optical system 530 may include aberration compensation modules associated with the second order Zernike polynomials, such as defocus, as described below with respect to FIG. 11. As such, freeform varifocal optical system 530 may shift the axial location of image points. Such image points may include the image of the stop of the display device 500, e.g. the exit pupil of display device 500. For a freeform varifocal optical system 530 including aberration compensation associated with at least the first and second order Zernike polynomials, freeform varifocal optical system 530 may be configured to shift the exit pupil vertically and/or horizontally, e.g. freeform varifocal optical system 530 may be configured to steer the exit pupil of display device 500 in accordance with a movement of the user's eye, and freeform varifocal optical system 530 may also be configured to cover the eye-relief change of the pupil steering where the defocus may be in accordance with the eye-relief change in the axial direction.

In addition, in some examples, freeform varifocal optical system 530 may be configured to correct for aberrations induced by pupil steering and avoid or reduce vignetting, for example, due to changes in exit pupil shape when pupil steering. For example, varifocal optical system 530 may include aberration compensation modules associated with higher order aberrations, e.g. third, fourth, fifth, etc., as described below with respect to FIG. 11. As such, varifocal optical system 530 may correct for aberrations induced by pupil steering.

The optical modules also optionally may include a plurality of switchable polarization control optical components, such as a switchable retarder. For example, a switchable half waveplate may be positioned before a corresponding polarization sensitive lensing element to control polarization of light incident on the corresponding polarization sensitive lensing element. By controlling the state of the switchable half waveplate, the polarization of light incident on the corresponding lens may be controlled, thus controlling an optical power of the corresponding lens between a first power for light of a first polarization (e.g., right circular polarization) and a second, different power (e.g., a negative of the first power) for light of a second polarization (e.g., left circular polarization). By including a plurality of polarization sensitive lensing elements having different optical powers and controlling the plurality of switchable polarization control optical components and, optionally, the polarization sensitive lensing elements, a freeform varifocal optical system 530 that provides focal power and aberration compensation may be produced.

Display device 500 is coupled to one or more processors 560. Processor(s) 560 are configured to control light emission device array 510 to display images and configured to control freeform varifocal optical system 530 to set a focal length of freeform varifocal optical system 530. Processor(s) 560 may represent any of the processors described herein, including processors 302 and 312 shown in FIGS. 3 and 4. Processor(s) 560 may include application-specific or other control circuitry, processing cores for executing instructions, discrete logic, or other hardware elements.

As described above, a varifocal optical assembly may include an aberration compensation assembly and at least one spherically lensing module. The at least one spherically lensing module may include, for example, one or more liquid lenses; one or more movable conventional lenses, and/or a plurality of optical elements comprising PBP lenses, PSH lenses, metamaterials, metasurfaces, or combinations thereof.

Figure 6:
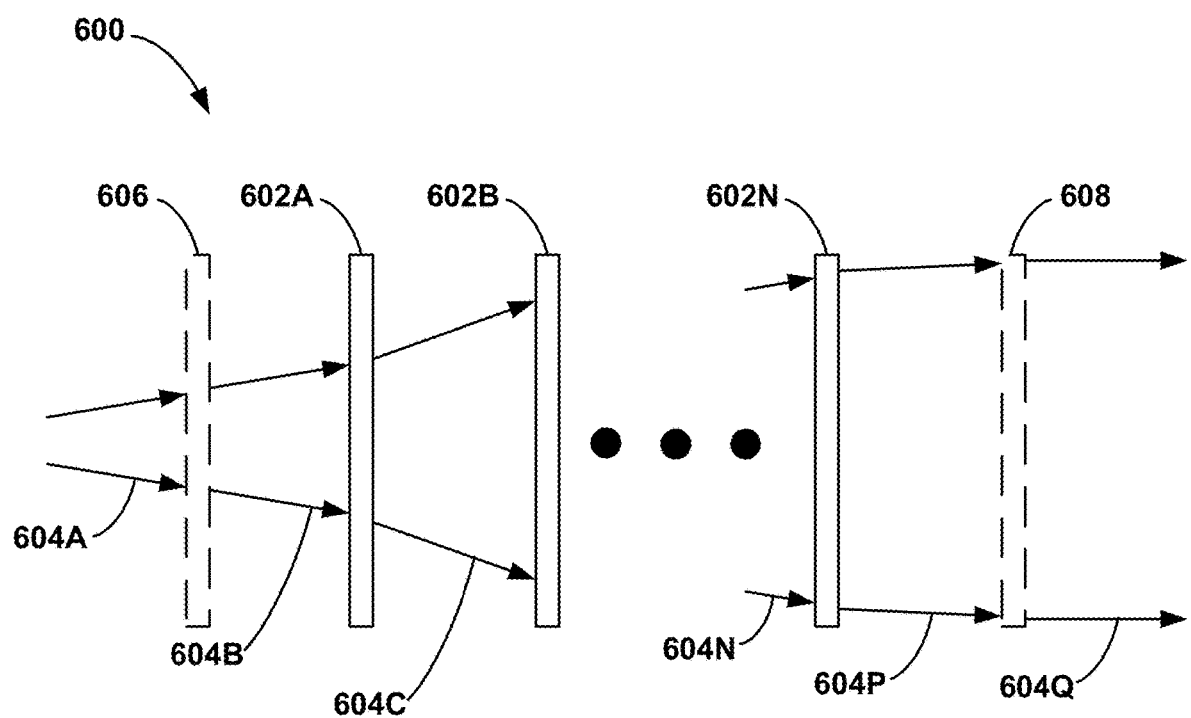
FIG. 6 is a schematic cross-sectional view of an example spherically lensing optical module.

FIG. 6 illustrates the operation of an example optical module 600, which may be part of optical assembly 530 of FIG. 5 or be part of optical system(s) 205 in FIGS. 2A-4. Optical module 600 may be associated with any selected aberration or corresponding lensing effect, such as tilt, tip (horizontal tilt), focus/defocus, cylindrical focus (astigmatism), trefoil, coma, quadrafoil, secondary astigmatism, etc, and may include corresponding polarization sensitive lensing elements. The example shown in FIG. 6 is described with reference to spherical lensing for ease of reference only, and similar concepts can be applied to other types of aberration and lensing. As shown in FIG. 6, optical module 600 includes a plurality of successive optical stages 602A, 602B, . . . , 602N (also referred to herein as "optical stage 602") configured to transmit light (e.g., light 604A-604Q) at various optical powers. Except for a first optical stage 602A, each respective optical stage of the successive optical stages receives incident light that is output from a prior stage. For example, as shown, second optical stage 602B receives light 604C that is output from first stage 602A. In some examples, each respective stage of the successive optical stages 602 is configurable to be in any of a plurality of states including a first state and a second state. In the first state, the respective optical stage has a first respective optical power for light of a first polarization and a second respective optical power, different from the first respective optical power, for light of a second polarization that is orthogonal to the first polarization. In the second state, the respective optical stage has a third optical power for light of the first polarization and a fourth optical power for light of the second polarization. As a result, an overall optical power of optical module 600 is variable by configuring one or more of the successive optical stages 602.

Optical module 600 may be configured to have an overall optical power that can be at any of at least two different levels of optical power for two optical stages (e.g., n=2). The overall optical power can have a larger number of different levels of optical power by adding more optical stages. In some examples, optical module 600 may further include one or more optical elements 606 before the first optical stage and/or one or more optical elements 608 after a last optical stage 602N.

Figure 7:
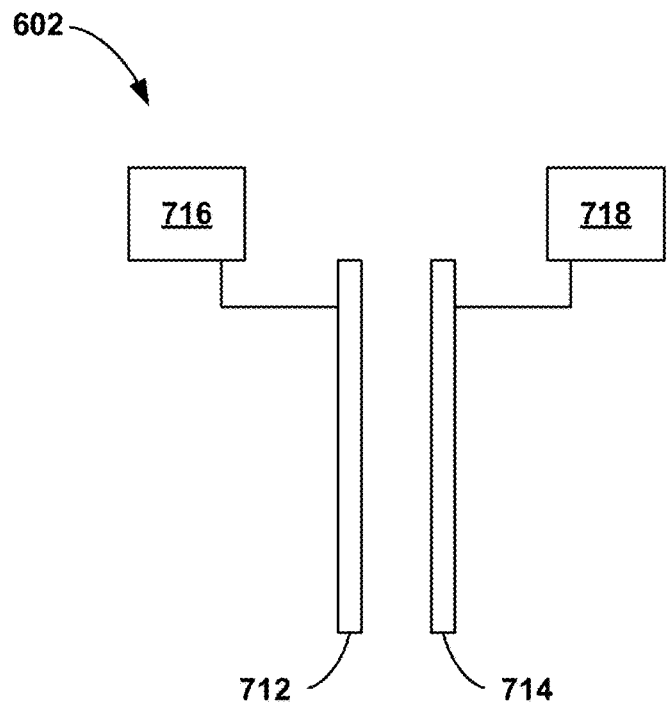
FIG. 7 is a conceptual diagram of an example optical stage of a spherically lensing optical module, which optical stage includes a first optical element and a second optical element in optical series with the first optical element in accordance with some examples of the disclosure.

Each optical stage 602 may include at least one optical element. For example, an optical stage may include a pair of optical elements. FIG. 7 is a conceptual diagram of an example optical stage 602 including a first optical element 712 and a second optical element 714 in optical series with first optical element 712.

First optical element 712 is configurable via a controller 716 to be in a first optical element state or a second optical element state. Controller 716 is an example of processor(s) 560 shown in FIG. 5. First optical element 712 may be a switchable optical retarder, such as a switchable half waveplate. In the first optical element state (e.g., an "off" state), first optical element 712 may be configured to convert light of a first or second polarization into light of a second or first polarization, respectively. The first polarization may be substantially orthogonal (e.g., orthogonal or nearly orthogonal) to the second polarization. In the second optical element state (e.g., an "on" state), first optical element 712 transmits incident light without changing polarization of the light. For example, when controller 716 sets first optical element 712 to the first state (e.g., by not applying a voltage across first optical element 712), left circularly polarized (LCP) light incident upon first optical element 712 will be output as right circularly polarized (RCP) light, and vice versa. In contrast, when controller 716 sets first optical element 712 to the second state (e.g., by applying a voltage across first optical element 712), light incident upon first optical element 712 will be transmitted without a change in its polarization (e.g., LCP light remains LCP and RCP light remains RCP).

First optical element 712 may include a liquid crystal (LC) cell, such as a nematic LC cell, a nematic LC cell with chiral dopants, a chiral LC cell, a uniform lying helix (ULH) LC cell, a ferroelectric LC cell, a pi-cell, or the like. In other examples, the LC cell includes an electrically drivable birefringence material.

Second optical element 714 is configured to receive light transmitted through first optical element 712. Second optical element 714 may be a lensing optical element (e.g., a lens or metamaterial/metasurface). In some examples, second optical element 714 is a polarization sensitive optical element, or a polarization-selective optical element. For example, second optical element 714 may include one or more of a PBP lens (also called a geometric phase lens), a PSH lens (e.g., a polarization volume hologram (PVH) lens), a metamaterial lens, or a metasurface lens. Details regarding PBP lenses and PSH lenses are provided below with respect to FIGS. 8A-8D and FIGS. 9A-9D, respectively.

Second optical element 714 may be passive (e.g., not connected to a controller 718 configured to selectively apply a voltage to second optical element 714 to change properties of second optical element 714) or active (e.g., connected to a controller 718 configured to selectively apply a voltage to second optical element 714 to change properties of second optical element 714). In examples in which second optical element 714 is passive, second optical element 714 has a first optical power for light of the first polarization and a second optical power, different from the first optical power, for light of the second polarization. In some examples, the second respective optical power is less than the first respective optical power. For example, the second respective optical power may be zero. For instance, second optical element 714 may exhibit a first optical power that is non-zero for RCP light and be configured convert the RCP light to LCP light while converging or diverging (depending on the first optical power) the RCP light. Second optical element 714 may be configured to transmit LCP light without focusing or changing the polarization of the LCP light.

In other examples, the second respective optical power is about equal in magnitude to the first respective optical power but is opposite in sign (effect) from the first respective optical power. For example, second optical element 714 may act as a positive lens that has an optical power of +0.5 diopters for incident light that is RCP and may act as a negative lens that has an optical power of −0.5 diopters for incident light that is LCP. Thus, the optical power of the second optical element 714, and therefore the optical power of the optical stage 602, may be based on the state of first optical element 712 and the polarization of light incident to optical stage 602.

In some examples, second optical element 714 is an active optical element that is configurable via controller 718 to be in a third optical element state (e.g., an "off" state) or a fourth optical element state (e.g., an "on" state). Controller 718 may be an example of processor(s) 560 shown in FIG. 5. In the third optical element state, active second optical element 714 is configured to have the first respective optical power for incident light having the first polarization and the second respective optical power for incident light having the second polarization, as described above with respect to examples in which second optical element 714 is passive. In the fourth optical element state, the active second optical element 714 is configured to have zero optical power and is configured to transmit the incident light without exerting optical power regardless of polarization of the incident light. As a result, optical stage 602 including first optical element 712 and an active second optical element 714 can exhibit more than two different states depending on the states of first optical element 712 and active second optical element 714, for example, an additive state for focusing the incident light, a subtractive state for defocusing the incident light, and a neutral state without exerting optical power regardless of polarization of the incident light.

In some examples, second optical element 714 is a thin film bonded to or formed on a surface of first optical element 712.

Second optical element 714 has an associated optical power (or multiple associated optical powers), which may be the same or different from second optical elements in other optical stages 602. In some examples, a magnitude(s) of the optical power of second optical element 714 is no greater than 2.0 diopters (e.g., the optical power is no stronger than −2 diopters or +2 diopters). In some examples, the magnitude(s) of the optical power of second optical element 714 is a power of two (e.g., $2^1=2$ Diopters, $2^0=1$ Diopters, $2^{-1}=0.5$ Diopters, $2^{-2}=0.25$ Diopters, $2^{-3}=0.125$ Diopters, or the like).

In some examples, an optical stage of the successive optical stages 602 (FIG. 6) includes only one of a first optical element 712 and an active second optical element 714. For example, an optical stage of the successive optical stages 702 may include active second optical element 714 without including first optical element 712.

Thus, controllers 716 and 718 (which are examples of processor(s) 560 of FIG. 5) may control the overall optical power for one or more types of aberration compensation of varifocal optical assembly 530 (FIG. 5) by controlling the respective states of optical stages 602 of optical module 600, as described with respect to FIG. 7.

FIGS. 8A-8D are schematic diagrams illustrating a Pancharatnam-Berry phase (PBP) lens 800 configured to exhibit spherical lensing in accordance with some examples. In some examples, the second optical element 714 of an optical stage 602 in the freeform varifocal optical assembly 600, described above with respect to FIGS. 6 and 7, includes PBP lens 800. In some examples, PBP lens 800 is a liquid crystal optical element that includes a layer of liquid crystals. In some examples, PBP lens 800 includes a layer of other type of substructures, e.g., nanopillars composed of high refraction index materials.

PBP lens 800 adds or removes spherical optical power based in part on polarization of incident light. For example, if RCP light is incident on PBP lens 800, PBP lens 800 acts as a positive lens (i.e., it causes light to converge). If LCP light is incident on PBP lens 800, PBP lens 800 acts as a negative lens (i.e., it causes light to diverge). PBP lens 800 also changes the handedness of light to the orthogonal handedness (e.g., changing LCP to RCP or vice versa). PBP lenses are also wavelength selective. If the incident light is at the designed wavelength, LCP light is converted to RCP light, and vice versa. In contrast, if incident light has a wavelength that is outside the designed wavelength range, at least a portion of the light is transmitted without change in its polarization and without focusing or converging. PBP lenses may have a large aperture size and can be made with a very thin liquid crystal layer. Optical properties of the PBP lens (e.g., focusing power or diffracting power) are based on variation of azimuthal angles (θ) of liquid crystal molecules. For example, for a PBP lens, azimuthal angle θ of a liquid crystal molecule is determined based on Equation (1):

$$\theta=(r^2/f^*\pi/\lambda)/2 \qquad (1)$$

where r denotes a radial distance between the liquid crystal molecule and an optical center of the PBP lens, f denotes a focal distance, and denotes a wavelength of light for which the PBP lens is designed. In some examples, the azimuthal angles of the liquid crystal molecules in the x-y plane increase from the optical center to an edge of the PBP lens. The liquid crystal director pattern (e.g., a pattern of the azimuthal angles of the liquid crystals) may be associated with a first Zernike polynomial $Z_2^0$, as describe in more detail below. In some examples, as expressed by Equation (1), a rate of increase in azimuthal angles between neighboring liquid crystal molecules also increases with the distance from the optical center of PBP lens 800. PBP lens 800 creates a respective lens profile based on the orientations (i.e., azimuthal angle θ) of liquid crystal molecules in the x-y plane of FIG. 8A. In contrast, a (non-PBP) liquid crystal lens creates a lens profile via a birefringence property (with liquid crystal molecules oriented out of x-y plane, e.g., a non-zero tilt angle from the x-y plane) and a thickness of a liquid crystal layer.

FIG. 8A illustrates a three-dimensional view of PBP lens 800 with incoming light 804 entering the lens along the z-axis.

FIG. 8B illustrates an x-y-plane view of PBP lens 800 with a plurality of liquid crystals (e.g., liquid crystals 802A and 802B) with various orientations. The orientations (i.e., azimuthal angles θ) of the liquid crystals vary along reference line between A and A' from the center of PBP lens 800 toward the periphery of PBP lens 800.

FIG. 8C illustrates an x-z-cross-sectional view of PBP lens 800. As shown in FIG. 8C, the orientations of the liquid crystal (e.g., liquid crystals 802A and 802B remain constant along z-direction. FIG. 8C illustrates an example of a PBP structure that has constant orientation along the z-axis and a birefringent thickness (Δn×t) that is ideally half of the designed wavelength, where Δn is the birefringence of the liquid crystal material and t is the physical thickness of the liquid crystal material of the PBP lens 800.

In some examples, a PBP optical element (e.g., lens, grating) may have a liquid crystal structure that is different from the one shown in FIG. 8C. For example, a PBP optical element may include a double twist liquid crystal structure along the z-direction. In another example, a PBP optical element may include a three-layer alternate structure along the z-direction in order to provide achromatic response across a wide spectral range.

FIG. 8D illustrates a detailed plane view of the liquid crystals along the reference line between A and A' shown in FIG. 8B. Pitch 806 is defined as a distance along the x-axis at which the azimuthal angle θ of a liquid crystal has rotated 180 degrees. In some examples, pitch 806 varies as a function of distance from the center of PBP lens 800. In a case of a spherical lens, the azimuthal angle θ of liquid crystals varies in accordance with Equation (1) shown above. In such cases, the pitch at the center of the lens is longest and the pitch at the edge of the lens is shortest.

FIGS. 9A-9D are schematic diagrams illustrating a polarization sensitive hologram (PSH) lens configured to exhibit spherical lensing in accordance with some examples. In some examples, second optical element 714 of an optical stage 602 in freeform varifocal optical system 600, described above with respect to FIGS. 6 and 7, includes PSH lens 900. PSH lens 900 is a liquid crystal PSH lens including a layer of liquid crystals arranged in helical structures (e.g., a liquid crystal formed of a cholesteric liquid crystal). Like a PBP lens (described above with respect to FIG. 8A-8D), a PSH lens 900 adds or removes spherical optical power based in part on polarization of an incident light. However, PSH lens 900 is selective with respect to circular polarization of light. When a state (handedness) of the circularly polarized light is the same as a helical twist of the liquid crystal layer, PSH lens 900 interacts with the circularly polarized light and thereby changes the direction of the light (e.g., diffracts the light). Concurrently, while diffracting the light, PSH lens 900 also changes the polarization of the light. In contrast, PSH lens 900 transmits light with opposite circular polarization without changing its direction or polarization. For example, PSH lens 900 may change polarization of RCP light to LCP light and simultaneously focus or defocus the light while transmitting LCP light without changing its polarization or direction. Optical properties of PSH lens 900 (e.g., focusing power or diffracting power) are based on variation of azimuthal angles of liquid crystal molecules. In addition, the optical properties of the PSH are based on a helical axis and/or a helical pitch of liquid crystals.

FIG. 9A illustrates a three-dimensional view of PSH lens 800 with incoming light 904 entering the lens along the z-axis. FIG. 9B illustrates an x-y plane view of PSH lens 900 with a plurality of liquid crystals (e.g., liquid crystals 902A and 902B) with various orientations. The orientations (i.e., azimuthal angle θ) of the liquid crystals vary along reference line between B and B' from the center of PSH lens 900 toward the periphery of PSH lens 900.

FIG. 9C illustrates an x-z-cross-sectional view of PSH lens 900. As shown in FIG. 9C, in contrast to PBP lens 800 described with respect to FIG. 8C, the liquid crystals (e.g., liquid crystals 902A and 902B in FIG. 9B) of PSH lens 900 are arranged in helical structures 918. Helical structures 918 have helical axes aligned parallel to the z-axis. As the azimuthal angle of respective liquid crystals on the x-y-plane varies, the helical structures create a volume grating with a plurality of diffraction planes (e.g., planes 920A and 920B) forming cycloidal patterns. The diffraction planes (e.g., Bragg diffraction planes) defined in a volume of PSH lens 900 are a result of a periodically changing refractive index. Helical structures or helical twist 918 define the polarization selectivity of PSH lens 900, as light with circular polarization handedness corresponding to the helical twist is diffracted while light with circular polarization with the opposite handedness is not diffracted. Helical structures 918 also define the wavelength selectivity of PSH lens 900, as helical pitch 922 determines which wavelength(s) are diffracted by PSH lens 900 (light with other wavelengths is not diffracted). For example, for a PSH lens, the designed wavelength for which the PSH lens will diffract the light is determined based on Equation (2):

$$\lambda = 2n_{eff} P_z \qquad (2)$$

where λ denotes a wavelength of light that PSH lens 900 is designed for, $P_z$ is distance of helical pitch 922, and $n_{eff}$ is the effective refractive index of the liquid crystal medium that is a birefringent medium. A helical pitch refers to a distance when a helix has made a 180 degree turn along a helical axis (e.g., the z-axis in FIG. 9C). The effective refractive index of the birefringent liquid crystal medium is determined based on Equation (3):

$$n_{eff} = \sqrt{n_e^2 + 2n_o^2/3} \qquad (3)$$

where $n_o$ is the ordinary refractive index of the birefringent medium and $n_e$ is the extraordinary refractive index of the birefringent medium.

FIG. 9D illustrates a detailed plane view of the liquid crystals along the reference line between B and B' in FIG. 9B. Pitch 906 is defined as a distance along x-axis at which the azimuth angle of liquid crystal has rotated 180 degrees from the initial orientation. In some embodiments, pitch 906 varies as a function of distance from the center of PSH lens 900. In a case of a spherical lens, the azimuthal angle of liquid crystals varies in accordance with Equation (1) shown above. In such cases, the pitch at the center of the lens is the longest and the pitch at the edge of the lens is the shortest.

Figure 10:
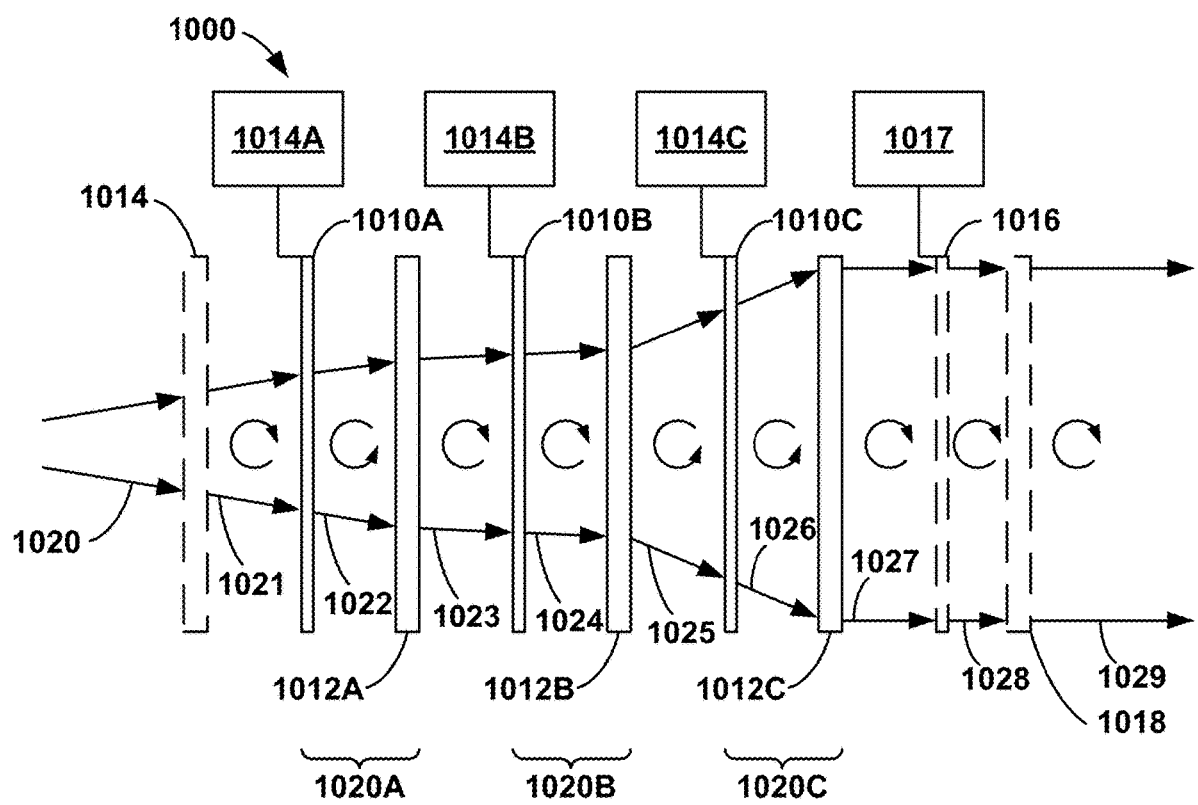
FIG. 10 is a schematic cross-sectional view of an example spherically lensing optical module.

FIG. 10 illustrates optical paths of light transmitted through a spherically lensing optical module 1000, which is an example of the optical module 600 described above in FIGS. 6 and 7. As shown, in this example, spherically lensing optical module 1000 includes a three-stage optical stack having optical stages 1020A, 1020B, and 1020C.

The first optical stage 1020A is configured to receive first light 1021 having a first divergence. The first light 1021 is transmitted through the optical stack and output from the last optical stage 1020C as second light 1022 having a second divergence that is different from the first divergence. In some examples, the second divergence is less than the first divergence (e.g., the second light is more collimated than the first light).

In the example of FIG. 10, first controller 1014A sets first optical element 1010A of first optical stage 1020A in the first state (an "off" state). Thus, first optical element 1010A receives first light 1021 having left-circular polarization (LCP) and converts the LCP first light 1021 to light 1022 having right-circular polarization (RCP). Second optical element 1012A of first optical stage 1020A receives RCP light 1022 having the first divergence and converts RCP light 1022 into third light 1023 having LCP while focusing it, resulting in third light 1023 having a third divergence that is smaller than the first divergence (e.g., second optical element 1012A acts as a converging lens and thus RCP light 1022 is converted into more converged LCP third light 1023).

In the example of FIG. 10, second controller 1014B has set first optical element 1010B of second optical stage 1020B in the second state (an "on" state). Thus, second optical element 1010B receives LCP third light 1023, output from first optical stage 1020A, and transmits LCP third light 1023 as LCP light 1024 without changing the polarization. Second optical element 1012B of second optical stage 1020B receives LCP light 1024 having the third divergence and converts LCP light 1024 into RCP fourth light 1025 while diverging it, resulting in fourth light 1025 having a fourth divergence that is larger than the third divergence (e.g., second optical element 1012B acts as a diverging lens and thus light 1024 is converted into more diverging RCP fourth light 1025).

In the example of FIG. 10, third controller 1014C has set a first optical element 1010C of a third and last optical stage 1020C in the second state (an "on" state). Thus, first optical element 1010C receives RCP fourth light 1025, output from second optical stage 1020B, and transmits RCP fourth light 1025 as RCP light 1026. Second optical element 1012C receives RCP light 1026 having the fourth divergence and converts RCP light 1026 into LCP fifth light 1027 while converging it, resulting in LCP fifth light 1027 having a fifth divergence that is smaller than the fourth divergence (e.g., second optical element 1012C acts as a converging lens and thus RCP light 1026 is converted into more converged LCP fifth light 1027). Since the third optical stage is the last optical stage in the optical stack, the fifth light 1027 having the fifth divergence corresponds to (e.g., is the same as) light output from the output end, as described above.

Thus, the additional optical stage 1020B is configured to receive light from a previous optical stage 1020A and transmit the light to a next optical stage such that the light output from the additional optical stage has a divergence that is different from the divergence of the light received by the optical stage. The divergence of the transmitted light is determined based on the divergence of the received light, the polarization of the received light, and a state of the first optical element of the additional optical stage.

In some examples, the spherically lensing optical module 1000 may also include a first polarizer 1014 at the input side of the optical stack. In some examples, the first polarizer 1014 is a circular polarizer configured to output a circular polarized light. In some examples, the first polarizer 1014 is a linear polarizer, and a quarter-wave plate is coupled to the first polarizer 1014 to convert linear polarized light output from the first polarizer 1014 to circular polarized light to be incident onto the first optical state 1020A. In some examples, the module 1000 also includes, at the output side of the optical stack, a switchable retarder 1016 that is electrically coupled to a controller 1017, and a second polarizer 1018. Switchable retarder 1016 has optical properties that are similar to (or the same as) those of first optical element 712 described above with reference to FIG. 7, which are therefore not repeated here for brevity. In some examples, switchable retarder 1016 is a switchable half wave plate. In some examples, switchable retarder 1016 and second polarizer 1018 are configured to reduce or eliminate light leakage that has an opposite handedness compared to the handedness of desired light 1029 output from the spherically lensing optical module 1000.

Optical aberration can be defined as the difference between an ideal image and the actual image that is processed through an optical system. Optical aberration has a negative effect on image quality by changing the size and the shape of the image compared to the ideal, and also may add blur to the ideal image, reducing the resolution of the perceived image. Optical aberration can also be defined as the difference between an ideal wavefront that maps object points to the ideal image points in the image plane and the actual wavefront as it propagates through the optical system. The optical properties of the corneal surface of an eye of a display observer and the corneal aberrations which result from refraction errors can be described with a sum of Zernike polynomials, which are used as mathematical blueprints of ocular aberrations. Each Zernike polynomial or Zernike term, referred to herein as a mode, describes a certain type of shape, a certain three-dimensional surface. The second-order Zernike terms represent the conventional corneal aberrations, e.g. defocus (spherical correction) and astigmatism.

Figure 11:
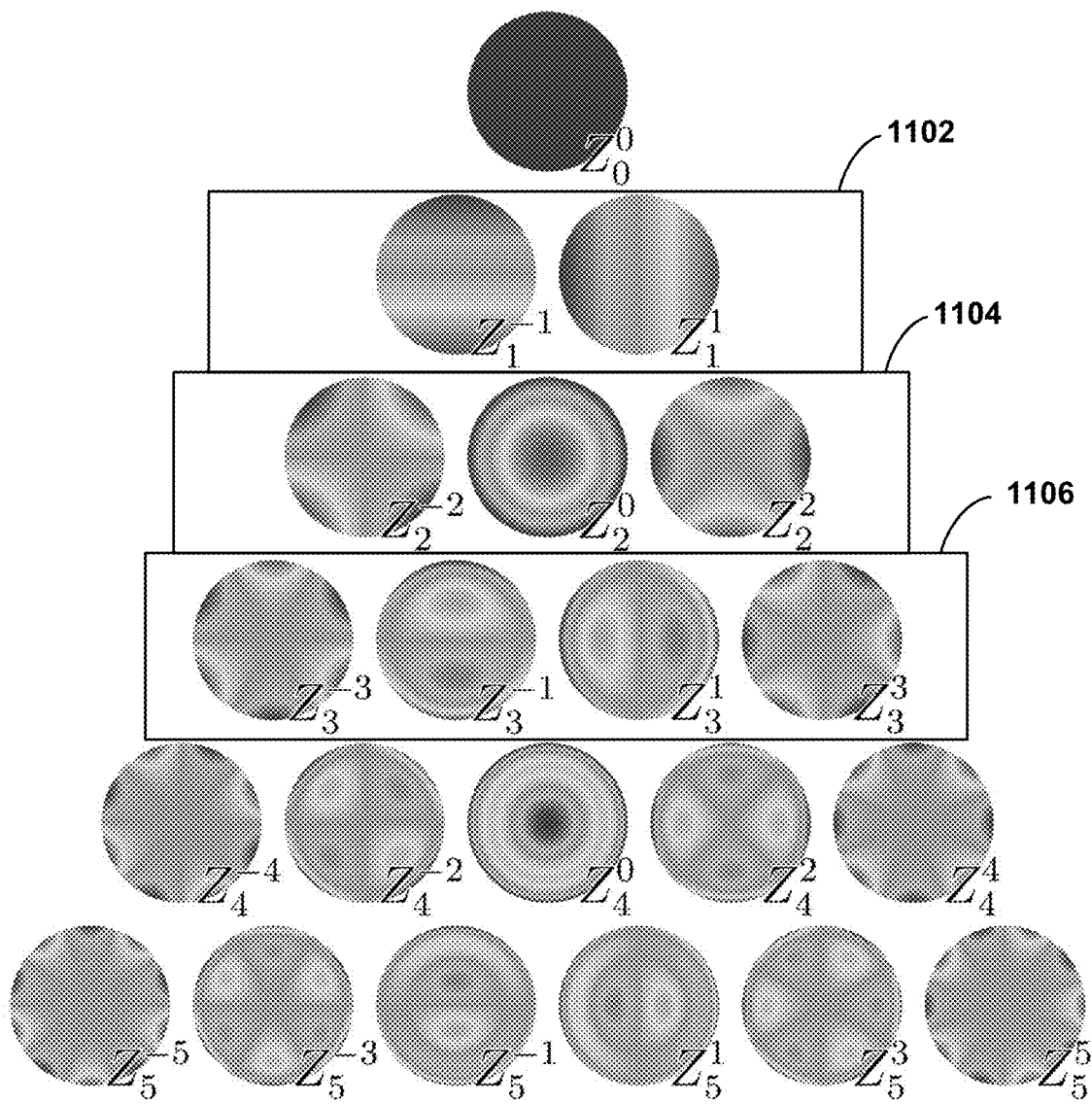
FIG. 11 is an image of the first 21 Zernike polynomials, ordered vertically by radial degree and horizontally by azimuthal degree.
Figure 12:
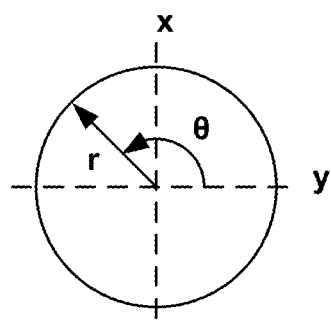
FIG. 12 is a schematic unit circle formed by orthogonal Zernike polynomials $Z_2^{-2}$ and $Z_2^2$.

FIG. 11 illustrates the first 21 Zernike polynomials, ordered vertically by radial degree and horizontally by azimuthal degree. The first order Zernike polynomials 1102 include a Zernike polynomial $Z_1^{-1}$ (tilt, e.g. vertical shift of an image point) and a Zernike polynomial $Z_1^{1}$ (tip, e.g. horizontal shift of an image point). The second order Zernike polynomials 1102 include a Zernike polynomial $Z_2^{0}$ (defocus), $Z_3^{-2}$ (oblique astigmatism with maxima at θ=45° and θ=+225° and minima at θ=135° and θ=315°), and a Zernike polynomial $Z_2^{2}$ (vertical astigmatism with maxima at θ=0° and θ=180° and minima at θ=90° and θ=270°). As shown in FIG. 12, a unit circle based expansion of the orthogonal Zernike polynomials $Z_3^{-2}$ and $Z_2^{2}$ can be represented as two orthogonal lines for which changes in the value along one line do not impact values along the other line, providing values of astigmatic power r at an axial location θ. As such, lenses such as PBP lenses and/or PSH lenses may be designed with LC molecule director orientation patterns associated with Zernike polynomials $Z_2^{-2}$ and $Z_2^{2}$ to provide astigmatism compensation in a varifocal optical assembly at a selected angle and a selected optical power by combining different optical powers of oblique and vertical astigmatism compensation. For example, by including three optical stages providing oblique astigmatism compensation with different optical powers and three optical stages providing vertical astigmatism compensation with different optical powers, an astigmatism compensation optical module may be configured to provide a total of 64 possible astigmatism compensation values (e.g. pairs of cylindrical optical power and correction axis).

The third order Zernike polynomials 1104 include a Zernike polynomial $Z_3^{-3}$ (vertical trefoil with maxima at θ=90°, 210° and 240° and minima at θ=45°, 120°), a Zernike polynomial $Z_3^{-1}$ (vertical coma), a Zernike polynomial $Z_3^{1}$ (horizontal coma), and a Zernike polynomial $Z_3^{3}$ (oblique trefoil with maxima at θ=0°, 120°, and 240° and minima at θ=60°, 180°, and 300°). As with the second order Zernike polynomials described above, the orthogonal Zernike polynomials ($Z_3^{-3}$, $Z_3^{3}$), and ($Z_3^{-1}$, $Z_3^{1}$), can be represented as two orthogonal lines for which changes in the value along one line do not impact values along the other line. As such, lenses such as PBP lenses and/or PSH lenses may be designed with LC molecule director orientation patterns associated with ($Z_3^{-3}$, $Z_3^{3}$), and ($Z_3^{-1}$, $Z_3^{1}$), to provide trefoil and coma compensation, respectively, in a varifocal optical assembly at a selected angle and a selected optical power by combining different optical powers of oblique and vertical trefoil compensation, and horizontal and vertical coma compensation.

In the same way, lenses such as PBP lenses and/or PSH lenses may be designed with LC molecule director orientation patterns associated with the higher order aberrations to provide compensation in a freeform varifocal optical assembly combining different optical powers of respective oblique, vertical, and horizontal higher order aberrations, as well as the higher order spherical aberrations as well, (e.g. $Z_{2n}^{0}$, where n is a positive integer).

Figure 13A:
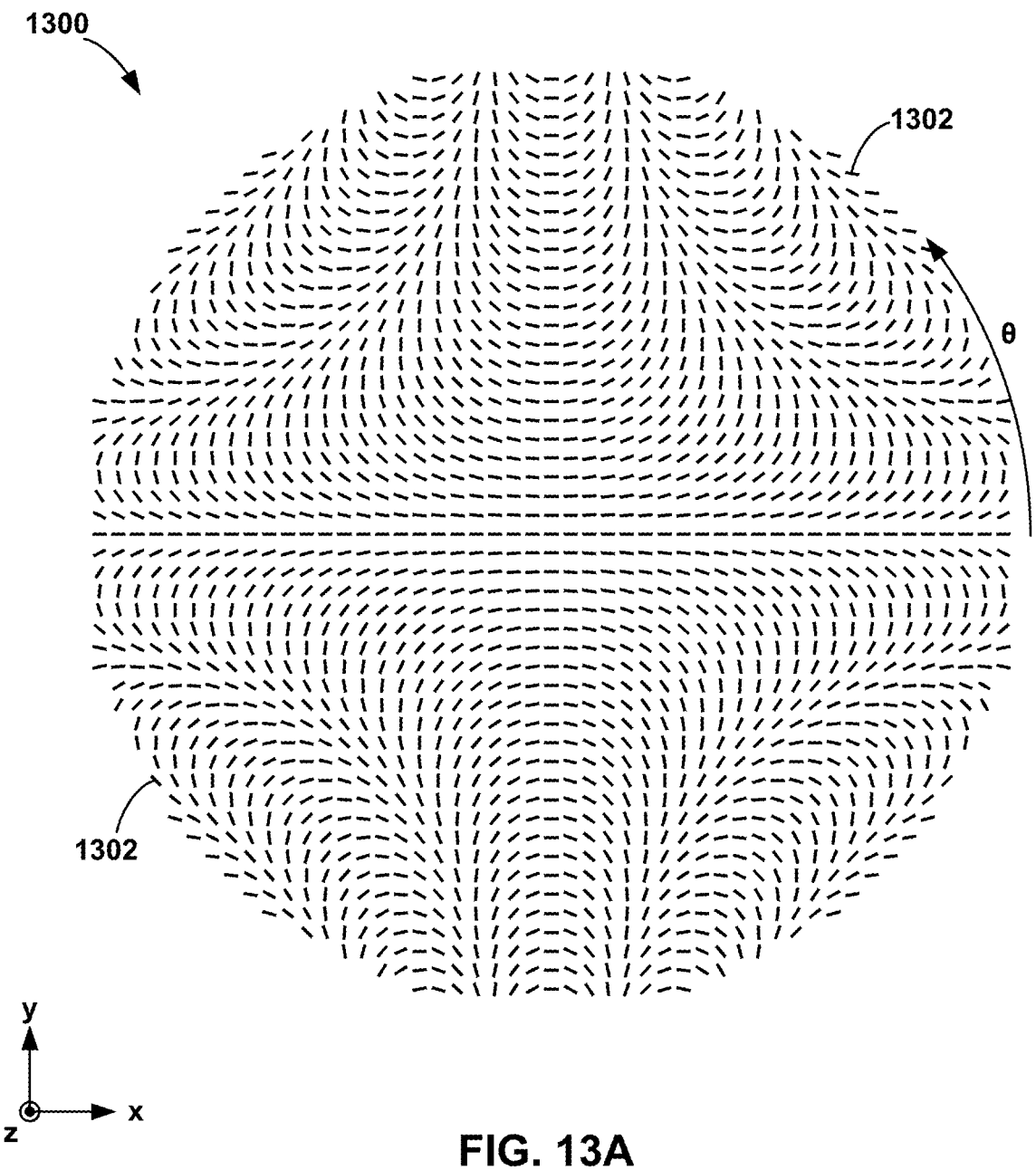
FIG. 13A is a schematic diagram of liquid crystal director orientations within a Pancharatnam-Berry phase lens for an oblique astigmatism compensation optical module associated with Zernike polynomial $Z_2^{-2}$.

FIG. 13A illustrates an x-y-plane view of an example PBP lens 1300 configured to provide oblique astigmatism compensation. PBP lens 1300 creates a lens profile based on the orientations (i.e., azimuthal angle θ) of a liquid crystal molecule in the x-y plane of FIG. 13A. PBP lens 1300 includes a plurality of liquid crystals 1302 having director orientations arranged in a pattern associated with (e.g., derived from) the Zernike polynomial $Z_2^{-2}$, which has maxima and minima dictated by the function sin 2θ. The liquid crystals 1302 are arranged to lens light to compensate for oblique astigmatism. The orientations of the liquid crystals 1302 along the z-axis may be similar to or substantially the same as that shown in FIG. 8C.

Figure 13B:
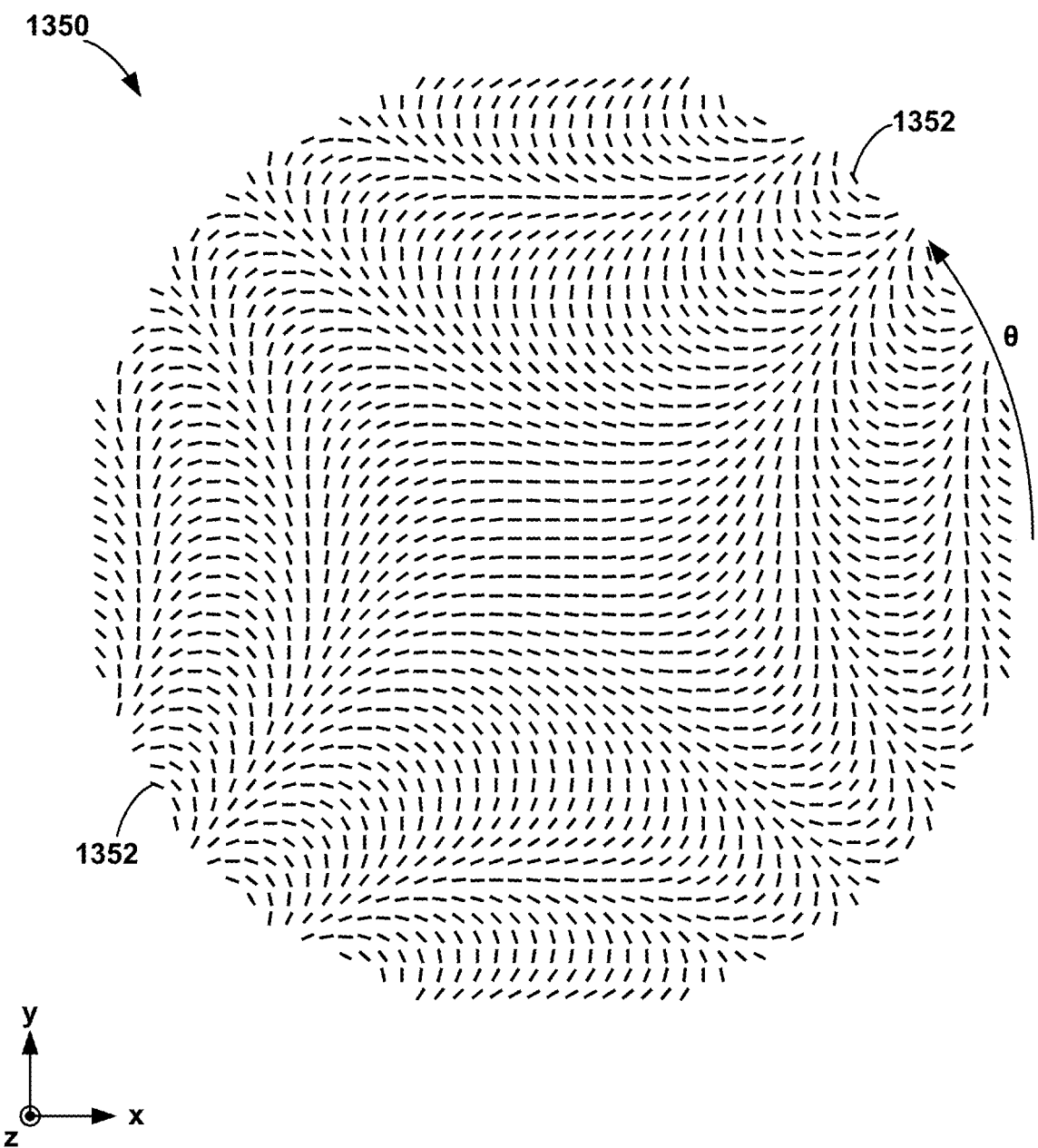
FIG. 13B is a schematic diagram of liquid crystal director orientations within a Pancharatnam-Berry phase lens for a vertical astigmatism compensation optical module associated with Zernike polynomial $Z_2^2$.

FIG. 13B illustrates an x-y-plane view of an example PBP lens 1350 configured to provide vertical astigmatism compensation. PBP lens 1350 creates a lens profile based on the orientations (i.e., azimuthal angle θ) of a liquid crystal molecule in the x-y plane of FIG. 13B. PBP lens 1350 includes a plurality of liquid crystals 1352 having director orientations arranged in a pattern associated with (e.g., derived from) the Zernike polynomial $Z_2^{2}$, which has maxima and minima dictated by the function cos 2θ. The liquid crystals 1352 are arranged to lens light to compensate for vertical astigmatism. The orientations of the liquid crystals 1352 along the z-axis may be similar to or substantially the same as that shown in FIG. 8C.

Figure 13C:
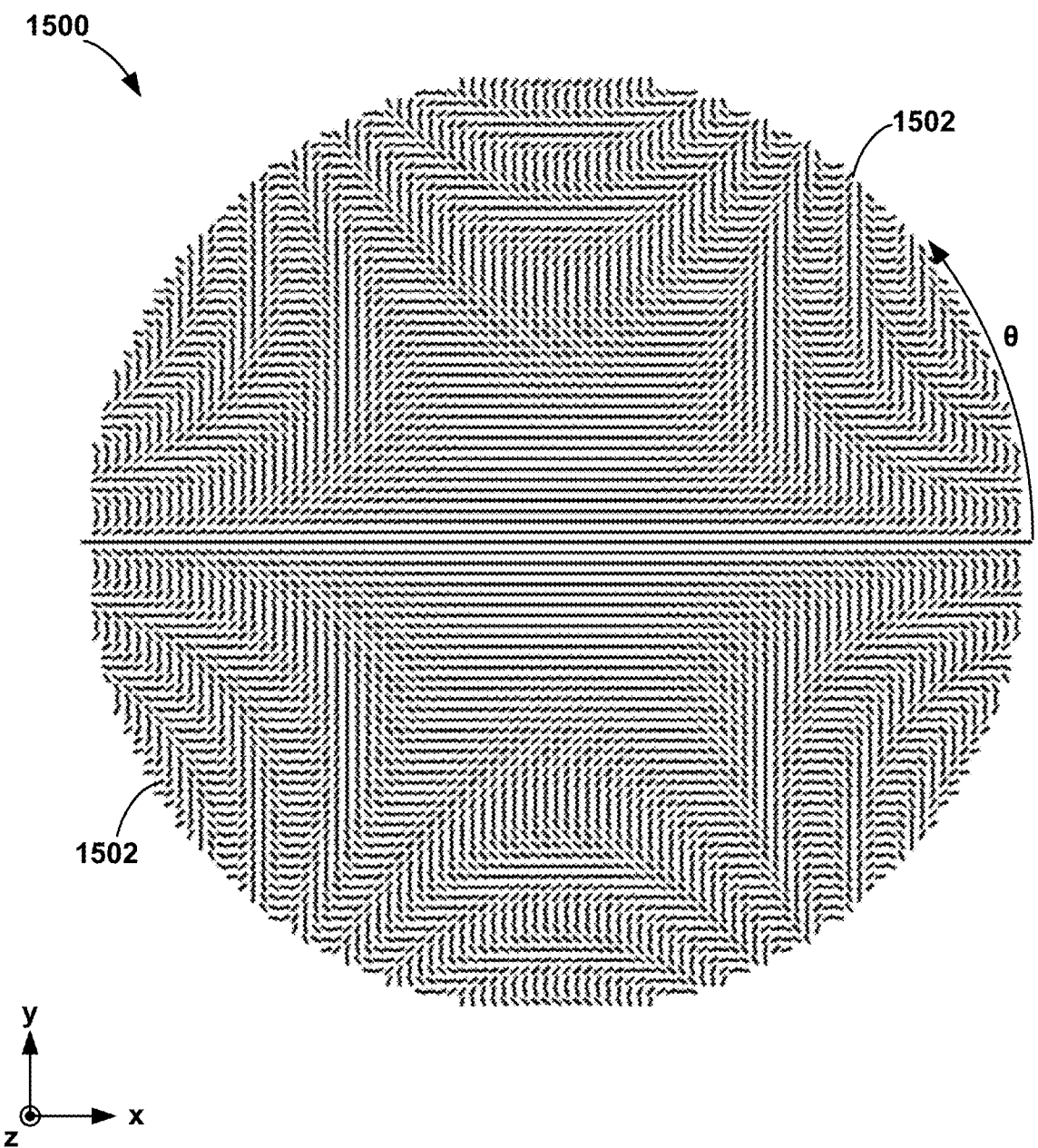
FIG. 13C is a schematic diagram of liquid crystal director orientations within a Pancharatnam-Berry phase lens for a vertical trefoil compensation optical module associated with Zernike polynomial $Z_3^{-3}$.

FIG. 13C illustrates an x-y-plane view of an example PBP lens 1500 configured to provide vertical trefoil compensation. PBP lens 1500 creates a lens profile based on the orientations (i.e., azimuthal angle θ) of a liquid crystal molecule in the x-y plane of FIG. 13C. PBP lens 1500 includes a plurality of liquid crystals 1502 having director orientations arranged in a pattern associated with (e.g., derived from) the Zernike polynomial $Z_3^{-3}$, which has maxima and minima dictated by the function sin 3θ. The liquid crystals 1502 are arranged to lens light to compensate for vertical trefoil. The orientations of the liquid crystals 1502 along the z-axis may be similar to or substantially the same as that shown in FIG. 8C.

Figure 13D:
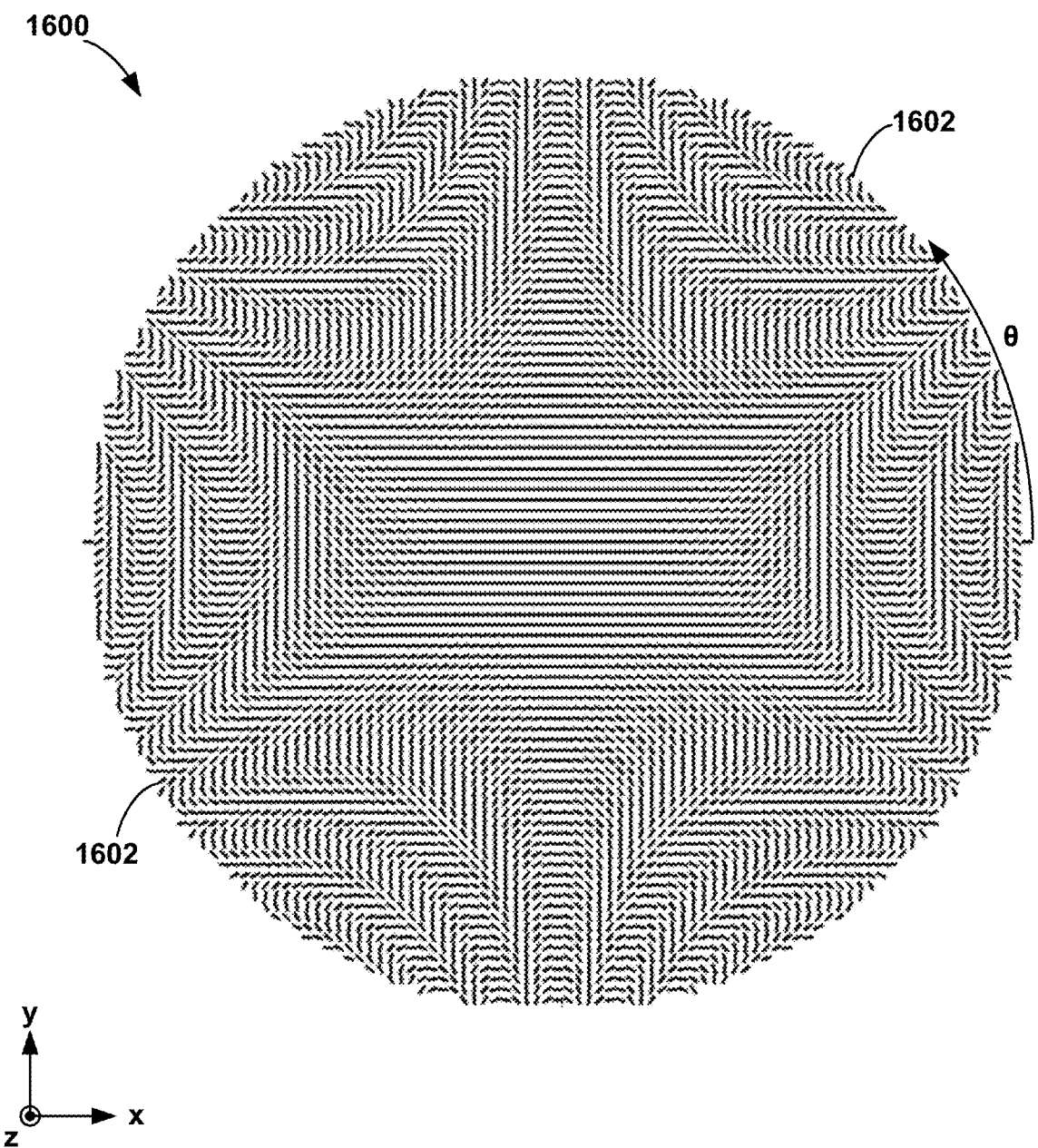
FIG. 13D is a schematic diagram of liquid crystal director orientations within a Pancharatnam-Berry phase lens for an oblique trefoil compensation optical module associated with Zernike polynomial $Z_3^3$.

FIG. 13D illustrates an x-y-plane view of an example PBP lens 1600 configured to provide oblique trefoil compensation. PBP lens 1600 creates a lens profile based on the orientations (i.e., azimuthal angle θ) of a liquid crystal molecule in the x-y plane of FIG. 13D. PBP lens 1600 includes a plurality of liquid crystals 1602 having director orientations arranged to in a pattern associated with (e.g., derived from) the Zernike polynomial $Z_3^{3}$, which has maxima and minima dictated by the function cos 3θ. The liquid crystals 1602 are arranged to lens light to compensate for oblique trefoil. The orientations of the liquid crystals 1602 along the z-axis may be similar to or substantially the same as that shown in FIG. 8C.

Figure 13E:
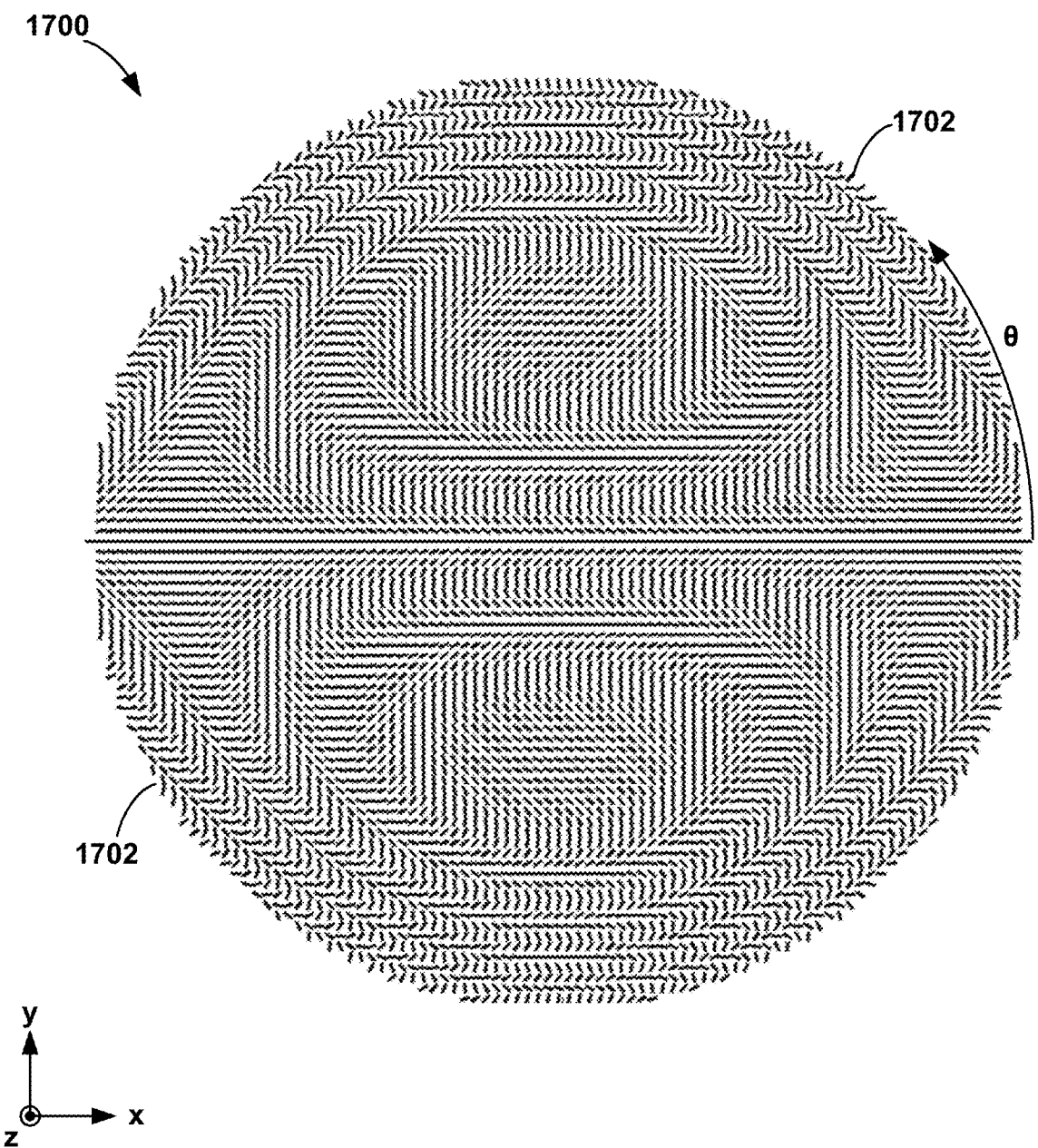
FIG. 13E is a schematic diagram of liquid crystal director orientations within a Pancharatnam-Berry phase lens for a vertical coma compensation optical module associated with Zernike polynomial $Z_3^{-1}$.

FIG. 13E illustrates an x-y-plane view of an example PBP lens 1700 configured to provide vertical coma compensation. PBP lens 1700 creates a lens profile based on the orientations (i.e., azimuthal angle θ) of a liquid crystal molecule in the x-y plane of FIG. 13E. PBP lens 1700 includes a plurality of liquid crystals 1702 having director orientations arranged in a pattern associated with (e.g., derived from) the Zernike polynomial $Z_3^{-1}$, which has maxima and minima dictated by the function sin θ. The liquid crystals 1702 are arranged to lens light to compensate for vertical coma. The orientations of the liquid crystals 1702 along the z-axis may be similar to or substantially the same as that shown in FIG. 8C.

Figure 13F:
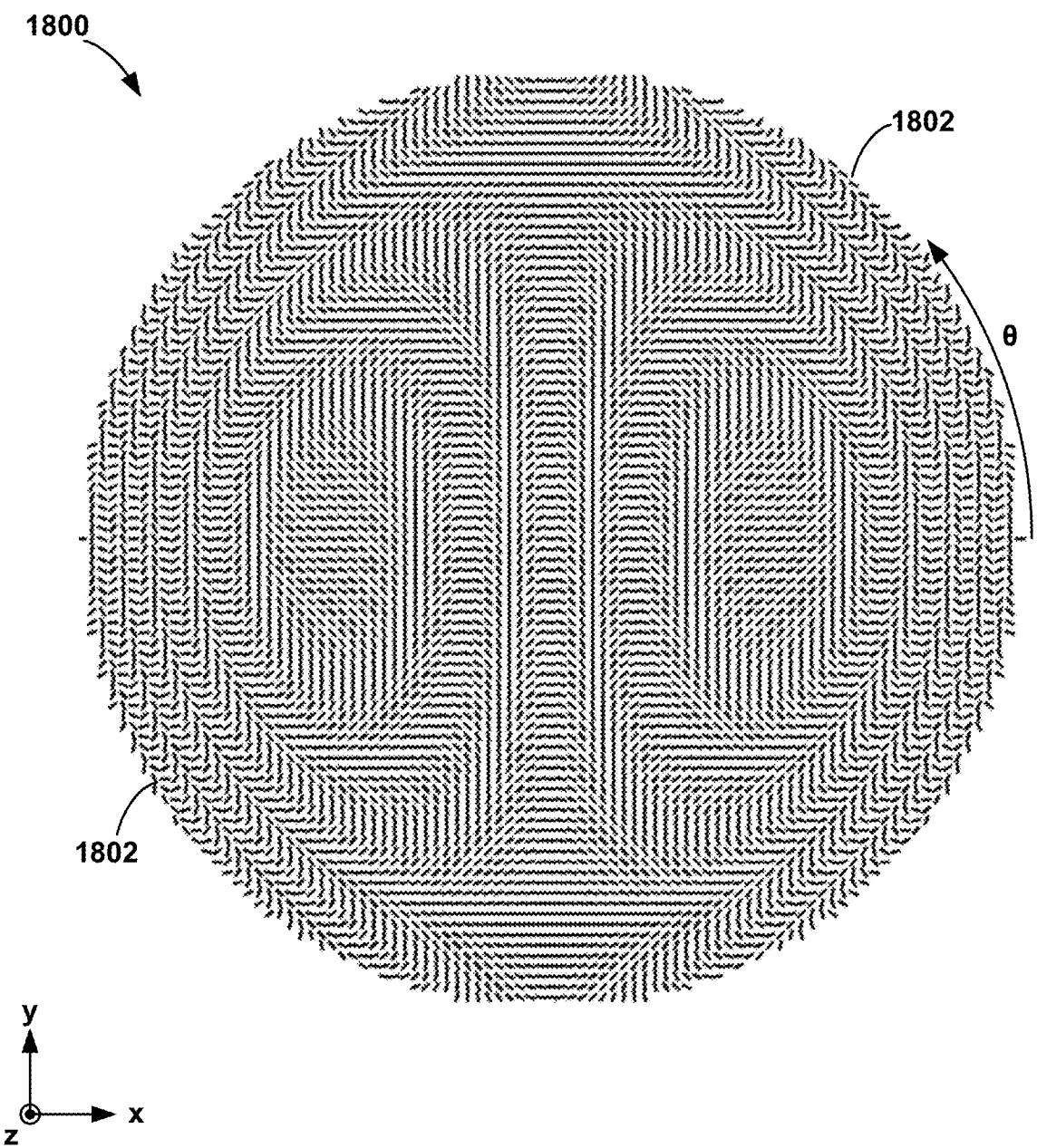
FIG. 13F is a schematic diagram of liquid crystal director orientations within a Pancharatnam-Berry phase lens for a horizontal coma compensation optical module associated with Zernike polynomial $Z_3^1$.

FIG. 13F illustrates an x-y-plane view of an example PBP lens 1800 configured to provide horizontal coma compensation. PBP lens 1800 creates a lens profile based on the orientations (i.e., azimuthal angle θ) of liquid crystal molecules in the x-y plane of FIG. 13F. PBP lens 1800 includes a plurality of liquid crystals 1802 having director orientations arranged in a pattern associated with (e.g., derived from) the Zernike polynomial $Z_3^{1}$, which has maxima and minima dictated by the function cos θ. The liquid crystals 1802 are arranged to lens light to compensate for horizontal coma. The orientations of the liquid crystals 1802 along the z-axis may be similar to or substantially the same as that shown in FIG. 8C.

Figure 13G:
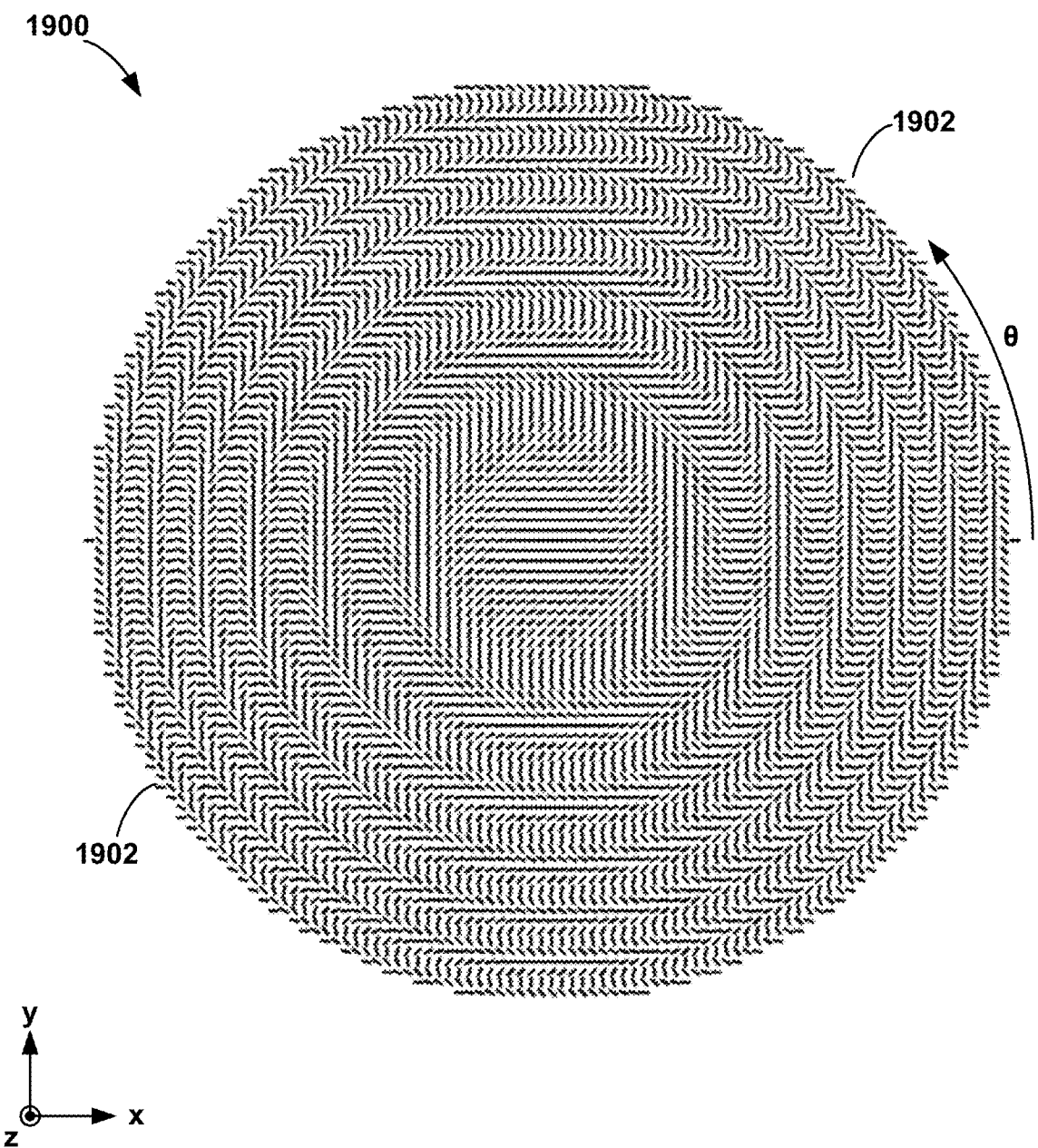
FIG. 13G is a schematic diagram of liquid crystal director orientations within a Pancharatnam-Berry phase lens for a horizontal coma compensation optical module associated with Zernike polynomial $Z_2^0$.

FIG. 13G illustrates an x-y-plane view of an example PBP lens 1900 configured to provide defocus compensation. PBP lens 1900 creates a lens profile based on the orientations (i.e., azimuthal angle θ) of liquid crystal molecules in the x-y plane of FIG. 13G. PBP lens 1900 includes a plurality of liquid crystals 1902 having director orientations arranged in a pattern associated with (e.g., derived from) the Zernike polynomial $Z_2^0$. The liquid crystals 1902 are arranged to lens light to compensate for horizontal coma. The orientations of the liquid crystals 1902 along the z-axis may be similar to or substantially the same as that shown in FIG. 8C.

In some examples, PBP lenses such as 1300-1900 can be configured to provide compensation for further aberrations, e.g. associated with any Zernike polynomial $Z_n^m$, where m is any integer and n is any positive integer.

Figure 14:
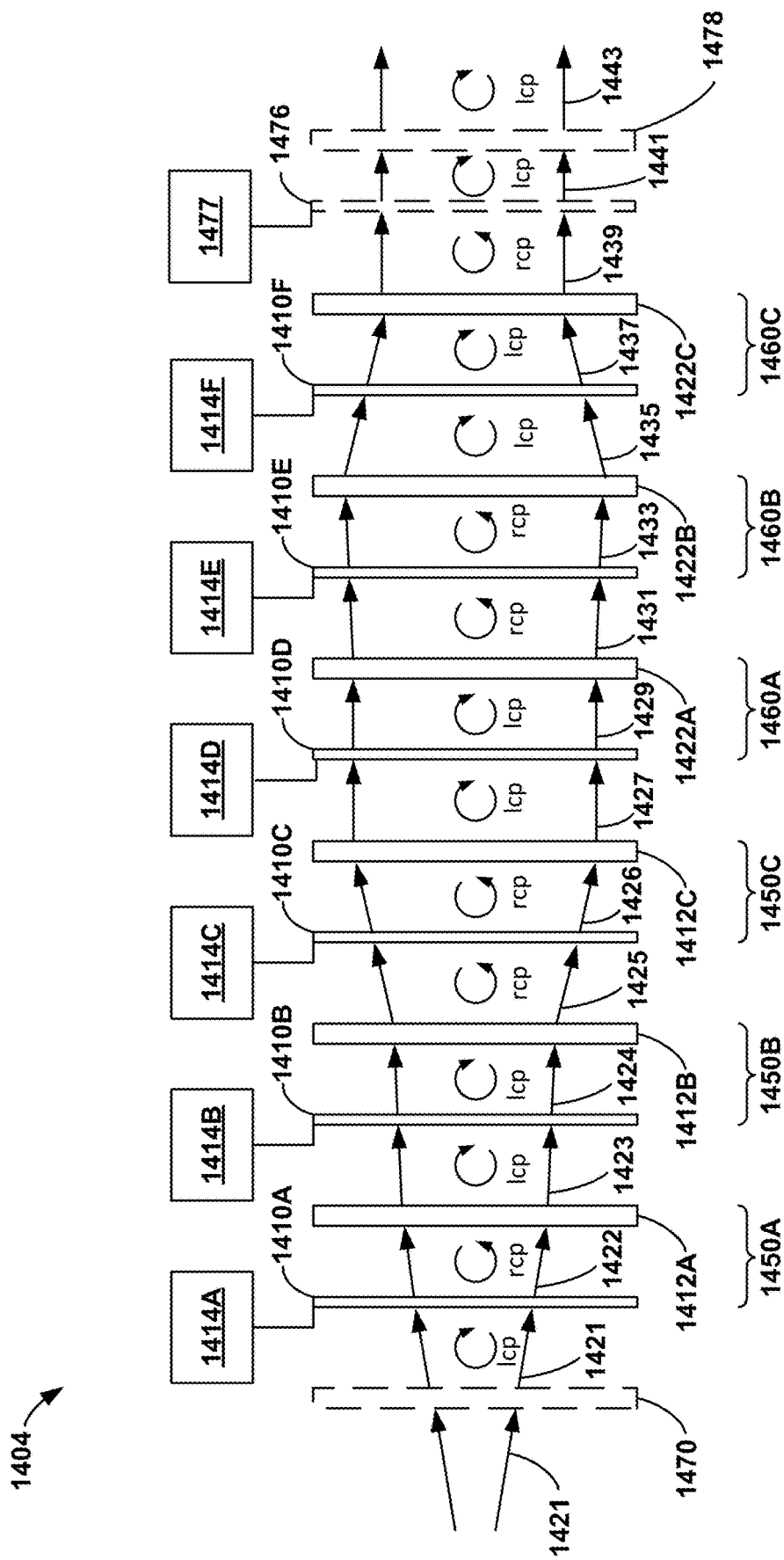
FIG. 14 is a schematic cross-sectional view of an optical device including an embodiment of a varifocal optical assembly including a vertical astigmatism compensation optical module and an oblique astigmatism compensation optical module.

FIG. 14 illustrates optical paths of light transmitted through an example aberration compensation optical assembly 1404 to form a freeform varifocal optical assembly that provides aberration compensation. Each second optical element of second optical elements 1412A-1412F is a PBP lens or a PSH lens having a pattern of LC directors configured to produce aberration compensation lensing along a selected axis, or a metamaterial or metasurface lens having a structure configured to produce aberration compensation lensing along a selected axis. For example, aberration compensation optical assembly 1404 includes a vertical astigmatism compensation module 1450 including three optical stages 1450A, 1450B, and 1450C. Aberration compensation optical assembly 1404 further includes an oblique astigmatism compensation module 1460 including a three optical stages 1460A, 1460B, and 1460C. Although each of vertical astigmatism compensation module 1450 and oblique astigmatism compensation module 1460 includes three optical stages in the example of FIG. 14, in other examples, vertical astigmatism compensation module 1450 and oblique astigmatism compensation module 1460 may include a different number of stages (generally, each may include at least two optical stages). Additionally, vertical astigmatism compensation module 1450 and oblique astigmatism compensation module 1460 may include the same number of optical stages or different numbers of optical stages. Additional optical stages in a given module may allow an increased number of effective optical powers for the module. Although the aberration compensation optical assembly 1404 includes a vertical astigmatism compensation module 1450 and oblique astigmatism compensation module 1460, the aberration compensation optical assembly 1404 can include a different number of modules each having one or more optical stages, for example, the further modules compensating for tilt, vertical and oblique trefoil, vertical and horizontal coma, primary spherical, secondary astigmatism, quadrafoil, etc.

Each second optical element 1412, 1422 in astigmatism compensation optical assembly 1404 may have a selected optical power, expressed in Diopters. In some examples, each second optical element 1412A-1412C in vertical astigmatism compensation module 1450 has a different optical power, and each second optical element 1422A-1422C in oblique astigmatism compensation module 1460 has a different optical power. In some examples, the optical powers may be powers of two (e.g., 21=2 Diopters, 20=1 Diopters, 2-1=0.5 Diopters, 2-2=0.25 Diopters, 23=0.125 Diopters, or the like). This may enable vertical astigmatism compensation optical module 1450 to achieve a plurality of optical powers for correcting vertical astigmatism and oblique astigmatism compensation optical module 1450 to achieve a plurality of optical powers for correcting oblique astigmatism, each based on control of the respective first and second optical elements 1410, 1412, 1422.

First optical stage 1450A of vertical astigmatism compensation module 1450 is configured to receive first light 1421 having a first divergence. First light 1421 is transmitted through the optical stack and output from the last optical stage of vertical astigmatism compensation module 1450 (third optical stage 1450C) as second light 1427 having a second divergence that is different from the first divergence. In some examples, the second divergence is less than the first divergence (e.g., second light 1427 is more collimated than first light 1421).

In this example, first controller 1414A controls first optical element 1410A of first optical stage 1450A to be in the first ("off") state. Thus, first optical element 1410A receives first light 1421 having left-circular polarization (LCP) and converts the LCP first light 1421 to light 1422 having right-circular polarization (RCP). Second optical element 1412A of first optical stage 1450A, which has a pattern of liquid crystal directors shown in FIG. 13A, receives RCP light 1422 having the first divergence and converts RCP light 1422 into third light 1423 having left-circular polarization (LCP) while focusing it, resulting in third light 1423 having a third divergence that is smaller than the first divergence (e.g., second optical element 1412A acts as a converging lens for RCP light and thus RCP light 1422 is converted into more converged LCP third light 1423).

In this example, second controller 1414B controls a first optical element 1410B of a second optical stage 1450B to be in the second ("on") state. Thus, second optical element 1410B receives LCP third light 1423, output from first optical stage 1450A and transmits LCP third light 1423 as LCP light 1424 without changing the polarization. Second optical element 1412B of second optical stage 1450B receives LCP light 1424 having the third divergence and converts LCP light 1424 into RCP fourth light 1425 while diverging it, resulting in fourth light 1425 having a fourth divergence that is larger than the third divergence (e.g., second optical element 1412B acts as a diverging lens for LCP light and thus LCP light 1424 is converted into more diverging RCP fourth light 1425).

In this example, third controller 1414C controls a first optical element 1410C of a third optical stage 1450C to be in the second ("off") state. Thus, first optical element 1410C receives RCP fourth light 1425, output from second optical stage 1450B, and transmits RCP fourth light 1425 as RCP light 1426 without changing its polarization. Second optical element 1412C receives RCP light 1426 having the fourth divergence and converts RCP light 1426 into LCP fifth light 1427 while converging it, resulting in fifth light 1427 having a fifth divergence that is smaller than the fourth divergence (e.g., second optical element 1412C acts as a converging lens for RCP light and thus RCP light 1426 is converted into more converged LCP fifth light 1427). Since third optical stage 1450C is the last optical stage in the vertical astigmatism compensation module 1450, the fifth light 1427 having the fifth divergence corresponds to (e.g., is the same as) light output from the output end described above.

Thus, a given optical stage is configured to receive light from a previous optical stage and transmit the light to a next optical stage such that the light output from the additional optical stage may have a divergence that is different from the divergence of the light received by the first optical stage. The divergence of the transmitted light is determined based on the divergence of the received light, the polarization of the received light, and a state of the first optical element of the additional optical stage.

In other examples, each of the second optical elements (e.g., the lens or grating) may be an active optical element, such that the second optical element may be controlled between two states, as described with reference to FIG. 7. In some examples, when the second optical element is controlled to be in an "on" state in which voltage is applied to the second optical element, the second optical element may not exhibit a lensing effect for at least some light (e.g., for light of a certain polarization), such that the second optical element may transmit light without lensing the light or changing a polarization of the light.

In the example of FIG. 14, light 1427 output from vertical astigmatism compensation module 1450 is incident to oblique astigmatism compensation module 1460. First optical stage 1460A in oblique astigmatism compensation module 1460 is configured to receive LCP fifth light 1427 output from vertical astigmatism compensation module 1450 that has a first divergence. The light 1427 is transmitted through oblique astigmatism compensation module 1460 and output from the last optical stage of oblique astigmatism compensation module 1460 (third optical stage 1460C) as light 1439 having a second divergence that is different from the first divergence. In some examples, the second divergence is less than the first divergence (e.g., the second light is more collimated than the first light)

In the example of FIG. 14, first optical stage 1460A is configured to receive LCP fifth light 1427. In this example, fourth controller 1414D controls first optical element 1410A of first optical stage 1460A to be in the second ("on") state. Thus, first optical element 1410A receives LCP fifth light 1427 having left-circular polarization (LCP) and transmits the LCP fifth light 1427 as LCP light 1429 having left-circular polarization (LCP). Second optical element 1422A of first optical stage 1460A, which has a pattern of liquid crystal directors shown in FIG. 9B, receives LCP light 1429 having the first divergence and converts LCP light 1429 into third light 1431 having right-circular polarization (RCP) while diverging it (e.g., second optical element 1422A acts as a diverging lens for LCP light and thus LCP light 1429 is converted into more diverged RCP light 1431).

Fifth controller 1414E controls a first optical element 1410E of a second optical stage 1460B to be in the second ("on") state. Thus, second optical element 1410E receives RCP third light 1431, output from first optical stage 1460A and transmits RCP third light 1431 as RCP light 1433 without changing the polarization. Second optical element 1422B of second optical stage 1460B receives RCP light 1433 having the third divergence and converts RCP light 1433 into LCP light 1435 while converging it, resulting in LCP light 1435 having a divergence that is smaller than the previous divergence (e.g., second optical element 1422B acts as a converging lens for RCP light and thus RCP light 1433 is converted into more converging LCP fourth light 1435).

Sixth controller 1414F controls a first optical element 1410F of a third optical stage 1460 to be in the second ("on") state. Thus, first optical element 1410F receives LCP light 1435, output from second optical stage 1460B, and transmits LCP light 1435 as LCP light 1437 without changing its polarization. Third optical element 1422C receives LCP light 1437 and converts LCP light 1437 into RCP light 1439 while diverging it, resulting in RCP light 1439 having a divergence that is larger than the previous divergence (e.g., third optical element 1422C acts as a diverging lens for LCP light and thus LCP light 1437 is converted into more diverged RCP light 1439). Since third optical stage 1460C is the last optical stage in oblique astigmatism compensation module 1460, RCP light 1439 having the fifth divergence corresponds to (e.g., is the same as) light output from the output end, as described above.

In some examples, the aberration compensation optical assembly 1404 may also include a first polarizer 1470 at an input side. In some examples, assembly 1404 also includes, at the output side, a switchable retarder 1476 that is electrically coupled to a controller 1477 and a second polarizer 1478. Switchable retarder 1476 has optical properties that are similar to (or the same as) those of first optical elements describes with respect to optical stages 1450 and 1460. In some examples, switchable retarder 1476 is a switchable half wave plate. Operation of each optical stage of the aberration compensation optical assembly 1404 is dependent on the polarization of light incident on the optical stage, a state of the first optical elements, and, optionally, a state of the second optical elements in examples in which the second optical elements are active optical elements.

As with spherically lensing optical module 1000 described above and shown in FIG. 10, the overall cylindrical optical power of vertical astigmatism compensation module 1450 and oblique astigmatism compensation module 1460 can be adjusted by adjusting or changing the respective states of first optical elements 1410 (and, optionally second optical elements 1412, 1422) in the plurality of optical stages 1450A-1450C, 1460A-1460C therein. The cylindrical optical power of astigmatism compensation optical modules 1450, 1460 can be changed by switching the states of the optical elements in any optical stage, thereby changing the optical power of the optical stage. The optical powers of the successive optical stages in combination determine the resultant total optical power of astigmatism compensation optical modules 1450, 1460.

Further, the relative optical powers of astigmatism compensation optical modules 1450, 1460 contribute to an effective axis of correction for aberration compensation optical assembly 1404.

The aberration compensation optical assembly 1404 may be used alone or in combination with other optical elements. For example, aberration compensation optical assembly 1404 may be used with any of spherically lensing optical module 1000, and any other optical assembly or compensation module configured to provide aberration compensation for any Zernike polynomial $Z_n^m$, to form a freeform varifocal aberration compensation optical assembly that provides both focus and higher order aberration compensation. Aberration compensation optical assemblies 1404 and 1000 may also be used with any other aberration compensation optical assembly corresponding to any other Zernike polynomial to form a freeform varifocal aberration compensation optical assembly that provides wavefront shaping, e.g. as an adaptive optic in an optical system. For example, the aberration compensation optical assemblies 1404 and 1000 may be used with any aberration compensation optical assembly configured to provide aberration compensation for piston (e.g. associated with the zero order Zernike polynomial); tilt, tip (e.g. associated with the first order Zernike polynomials); focus/defocus, cylindrical focus/astigmatism (e.g. associated with the second order Zernike polynomials); trefoil, coma (e.g. associated with the third order Zernike polynomials); quadrafoil, secondary astigmatism, primary spherical (e.g. associated with the fourth order Zernike polynomials); and any other of the higher order aberrations.

In one example, a user may interact with a UI element to adjust the freeform varifocal optical assembly that provides aberration compensation (e.g., the combination of at least one spherically lensing optical module 1000 and at least one aberration compensation optical module, such as vertical astigmatism compensation module 1450 and oblique astigmatism compensation module 1460). This may allow the user to fine-tune spherical, cylindrical and axis values to find an improved display image for a particular eye of the user. The UI element may be one of UI elements 329 presented as part of a virtual reality content output by electronic display(s) 203, or may include with for example, a suitable dial, thumb wheel, or slider, or other mechanical user input mechanism. In another example, a user can input a selected prescription for one or both eyes using UI elements 329, and processor(s) 302 may configure the optical stages to provide optical correction corresponding to the prescription. In this way, the cylindrical optical power of the first and second astigmatism compensation optical module (e.g., the optical power of the first astigmatism compensation optical module and the optical power of the second astigmatism compensation optical module) are configured based on astigmatism of a user of the varifocal optical assembly.

Additionally, although the present description has primarily been described as addressing astigmatism of a user, the astigmatism compensation optical modules described herein may be used to compensate for optical aberrations introduced by other optical elements within an optical system in which astigmatism compensation optical modules are used.

Further, while the astigmatism compensation optical assembly 1404 has been described with all optical stages relating to vertical astigmatism compensation being successive stages and all optical stages relating to oblique astigmatism compensation being successive stages, an optical stage relating to vertical astigmatism compensation may be between two optical stages relating to oblique astigmatism compensation, or other optical stages relating to other high order aberrations, (e.g. vertical and oblique trefoil, vertical and horizontal coma, etc.) and/or vice versa. Similarly, although the optical stages of spherically lensing optical module 1000 have been described as being successive optical stages separate from aberration compensation optical assembly 1404, optical stages of spherically lensing optical module 1000 may be interleaved with stages of aberration compensation optical assembly 1404. In some examples, optical stages with the greatest optical power magnitude are located closest to an eye of a user or viewer.

The present disclosure is further directed to a method of providing a visual correction for an observer of a display. The method includes transmitting light through a first aberration compensation optical module including a first plurality of optical stages. Each optical stage may include an optical element from a first plurality of optical elements comprising Pancharatnam-Berry-phase (PBP) lenses, polarization sensitive hologram (PSH) lenses, metamaterials, or combinations thereof. The first plurality of optical elements include a property associated with a first Zernike polynomial $Z_n^m$, where m is any integer and n is any positive integer. Each stage of the first plurality of optical stages is configurable to be in any of a plurality of states including a first state and a second state.

The method also includes adjusting a first focal power of the first aberration compensation optical module by changing respective states of one or more optical stages of the first plurality of optical stages.

The method further may include transmitting light through a second aberration compensation optical module including a second plurality of optical stages. Each optical stage may include an optical element from a second plurality of optical elements comprising PBP lenses, PSH lenses, metamaterials, or combinations thereof. The second plurality of optical elements include a property associated with a second Zernike polynomial $Z_n^m$ different from the first Zernike polynomial. Each stage of the second plurality of optical stages is configurable to be in any of a plurality of states including a first state and a second state. The method additionally includes adjusting a second focal power of the second aberration compensation optical module by changing respective states of one or more optical stages of the second plurality of optical stages.

The method also may optionally include transmitting light through a third aberration compensation optical module comprising a third plurality of optical stages. Each optical stage may include an optical element from a third plurality of optical elements comprising PBP lenses, PSH lenses, or combinations thereof. The third plurality of optical elements include a property associated with a third Zernike polynomial $Z_n^m$ different from both the first and second Zernike polynomials. Each stage of the third plurality of optical stages is configurable to be in any of a plurality of states including a first state and a second state. The method also may include adjusting a third focal power of the aberration compensation optical module by changing respective states of one or more optical stages of the third plurality of optical stages.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs or videos). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. A freeform varifocal lens comprising:
   at least three optical modules, each optical module comprising a corresponding plurality of polarization sensitive optical elements, wherein each optical module is associated with a corresponding Zernike polynomial, wherein for each optical module, the corresponding plurality of polarization-selective optical elements comprises a corresponding property associated with the corresponding Zernike polynomial, and wherein the corresponding Zernike polynomial associated with each optical module is different,
   wherein one or more optical stages in each optical module comprises a switchable optical retarder and an optical element comprising a Pancharatnam-Berry phase (PBP) lens or a polarization sensitive hologram (PSH) lens, wherein the switchable optical retarder is configured to transmissively convert light of a first polarization or a second polarization into light of the second polarization or the first polarization, respectively,
   wherein the optical element of a first optical module of the optical modules is configured to receive light transmitted through the switchable optical retarder of the first optical module and is configured to change a higher order aberration compensation depending on whether the light transmitted through the switchable optical retarder has the first polarization or the second polarization.

2. The freeform varifocal lens of claim 1, wherein the corresponding plurality of polarization sensitive optical elements comprise PBP lenses, PSH lenses, metamaterials, or combinations thereof.

3. The freeform varifocal lens of claim 1, wherein each optical stage comprises at least one optical element, and wherein at least some of the optical elements within each optical module have different optical powers.

4. The freeform varifocal lens of claim 1, wherein:
   the switchable optical retarder is configurable to be in an "off" state or an "on" state, wherein:
      in the "off" state, the switchable optical retarder is configured to convert the light of the first polarization or the second polarization into the light of the second polarization or the first polarization, respectively; and
      in the "on" state, the switchable optical retarder transmits light without changing its polarization.

5. The freeform varifocal lens of claim 1, wherein each optical module is configured to provide a wavefront adjustment associated with the corresponding Zernike polynomial to an incident wavefront.

6. The freeform varifocal lens of claim 1, wherein the at least three optical modules are configured to output a variable wavefront based on different combinations of respective wavefront adjustments.

7. The freeform varifocal lens of claim 1, wherein each optical element of the corresponding plurality of optical elements comprises a PBP lens and wherein the property comprises a liquid crystal director pattern.

8. The freeform varifocal lens of claim 1, further comprising at least one of a circular polarizer or a linear polarizer.

9. The freeform varifocal lens of claim 1, wherein the corresponding Zernike polynomial of a first optical module is associated with tilt in a first direction, the corresponding Zernike polynomial of a second optical module is associated with tilt in a second direction, the corresponding Zernike polynomial of a third optical module is associated with focus, the corresponding Zernike polynomial of a fourth optical module is associated with oblique astigmatism, and the corresponding Zernike polynomial of a fifth optical module is associated with vertical astigmatism.

10. The freeform varifocal lens of claim 1, wherein at least one optical module is associated with trefoil, coma, quadrafoil, or secondary astigmatism.

11. A display comprising:
a light source configured to emit image light; and
a freeform varifocal optical assembly configured to guide the image light to an eyebox of the display, the freeform varifocal optical assembly comprising:
at least three optical modules, each optical module comprising a corresponding plurality of polarization sensitive optical elements, wherein each optical module is associated with a corresponding Zernike polynomial, wherein, for each optical module, the corresponding plurality of optical elements comprises a corresponding property associated with the corresponding Zernike polynomial, and wherein the corresponding Zernike polynomial associated with each optical module is different,
wherein one or more optical stages in each optical module comprises a switchable optical retarder and an optical element comprising a Pancharatnam-Berry phase (PBP) lens or a polarization sensitive hologram (PSH) lens, wherein the switchable optical retarder is configured to transmissively convert light of a first polarization or a second polarization into light of the second polarization or the first polarization, respectively,
wherein the optical element of a first optical module of the optical modules is configured to receive light transmitted through the switchable optical retarder of the first optical module and is configured to change a higher order aberration compensation depending on whether the light transmitted through the switchable optical retarder has the first polarization or the second polarization.

12. The display of claim 11, wherein the corresponding plurality of polarization-sensitive optical elements comprise PBP lenses, PSH lenses, metamaterials, or combinations thereof.

13. The display of claim 11, wherein each optical stage comprises at least one optical element, and wherein at least some of the optical elements within each optical module have different optical powers.

14. The display of claim 11, wherein:
the switchable optical retarder is configurable to be in an "off" state or an "on" state, wherein:
in the "off" state, the switchable optical retarder is configured to convert the light of the first or the second polarization into the light of the second polarization or the first polarization, respectively; and
in the "on" state, the switchable optical retarder transmits incident light without changing its polarization.

15. The display of claim 11, wherein each optical module is configured to provide a wavefront adjustment associated with the corresponding Zernike polynomial to an incident wavefront.

16. The display of claim 11, wherein the at least three optical modules are configured to output a variable wavefront based on different combinations of respective wavefront adjustments.

17. The display of claim 11, wherein the freeform optical assembly is configured to steer an exit pupil of the head mounted display, and wherein the freeform optical assembly is further configured to compensate for aberrations of the exit pupil of the display.

18. The display of claim 11, wherein the display comprises a head mounted display.

19. A method comprising:
transmitting light through at least three optical modules, each optical module comprising a plurality of polarization sensitive optical elements, wherein each optical module is associated with a corresponding Zernike polynomial, wherein for each optical module, the corresponding plurality of optical elements comprises a corresponding property associated with the corresponding Zernike polynomial, wherein the corresponding Zernike polynomial associated with each optical module is different,
wherein one or more optical stages in each optical module comprises a switchable optical retarder and an optical element comprising a Pancharatnam-Berry phase (PBP) lens or a polarization sensitive hologram (PSH) lens, wherein the switchable optical retarder is configured to transmissively convert light of a first polarization or a second polarization into light of the second polarization or the first polarization, respectively,
wherein the optical element of a first optical module of the optical modules is configured to receive light transmitted through the switchable optical retarder of the first optical module and is configured to change a higher order aberration compensation depending on whether the light transmitted through the switchable optical retarder has the first polarization or the second polarization; and
adjusting the focal power of one or more of the at least three optical modules by changing respective states of one or more optical elements of the plurality of optical elements in the one or more of the at least three optical modules.

20. The method of claim 19, wherein the corresponding plurality of polarization-sensitive optical elements comprise PBP lenses, PSH lenses, metamaterials, or combinations thereof.

21. The method of claim 19, wherein:
the switchable optical retarder is configurable to be in an "off" state or an "on" state, wherein
in the "off" state, the switchable optical retarder is configured to convert the light of the first polarization or the second polarization into the light of the second polarization or the first polarization, respectively; and
in the "on" state, the switchable optical retarder transmits incident light without changing its polarization; and
adjusting the respective focal power comprises controlling the state of the switchable optical retarders.

* * * * *